United States Patent
Hirota et al.

(10) Patent No.: US 6,644,023 B2
(45) Date of Patent: Nov. 11, 2003

(54) EXHAUST EMISSION CONTROL DEVICE OF INTERNAL COMBUSTION ENGINE

(75) Inventors: Shinya Hirota, Susono (JP); Toshiaki Tanaka, Numazu (JP); Kazuhiro Itoh, Mishima (JP); Takamitsu Asanuma, Susono (JP); Koichiro Nakatani, Susono (JP); Koichi Kimura, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/088,477

(22) PCT Filed: Jul. 23, 2001

(86) PCT No.: PCT/JP01/06349

§ 371 (c)(1),
(2), (4) Date: Mar. 20, 2002

(87) PCT Pub. No.: WO02/08580

PCT Pub. Date: Jan. 31, 2002

(65) Prior Publication Data

US 2002/0162324 A1 Nov. 7, 2002

(30) Foreign Application Priority Data

Jul. 24, 2000 (JP) ........................................ 2000-222725

(51) Int. Cl.[7] .................................................. F01N 3/00
(52) U.S. Cl. ............................. 60/297; 60/311; 60/296; 60/287
(58) Field of Search .......................... 60/311, 301, 297, 60/287, 296; 55/DIG. 30, 483, 484

(56) References Cited

U.S. PATENT DOCUMENTS

| | | | | |
|---|---|---|---|---|
| 4,386,497 A | * | 6/1983 | Takagi et al. | 60/288 |
| 4,404,798 A | * | 9/1983 | Takagi et al. | 60/296 |
| 4,462,379 A | * | 7/1984 | Tsuge et al. | 60/278 |
| 4,485,622 A | * | 12/1984 | Takagi et al. | 60/296 |
| 4,515,758 A | * | 5/1985 | Domesle et al. | 423/213.2 |
| 5,042,249 A | * | 8/1991 | Erdmannsdoerfer | 60/299 |
| 5,162,287 A | * | 11/1992 | Yoshimoto et al. | 502/439 |
| 5,423,904 A | * | 6/1995 | Dasgupta | 96/131 |
| 5,489,319 A | * | 2/1996 | Tokuda et al. | 96/400 |
| 5,738,832 A | * | 4/1998 | Dogahara et al. | 422/171 |
| 5,863,311 A | * | 1/1999 | Nagai et al. | 55/483 |
| 6,167,696 B1 | * | 1/2001 | Maaseidvaag et al. | 60/274 |
| 6,367,246 B1 | * | 4/2002 | Hirota et al. | 60/295 |

FOREIGN PATENT DOCUMENTS

| | | | |
|---|---|---|---|
| JP | 57-65812 | * | 4/1982 |
| JP | 61-164014 | * | 7/1986 |
| JP | A 62-210212 | | 9/1987 |
| JP | A 5-179928 | | 7/1993 |
| JP | A 5-256121 | | 10/1993 |
| JP | A 9-125931 | | 5/1997 |

* cited by examiner

Primary Examiner—Thomas Denion
Assistant Examiner—Diem T Tran
(74) Attorney, Agent, or Firm—Oliff & Berridge, PLC

(57) ABSTRACT

The present device for purifying the exhaust gas of an internal combustion engine comprises a particulate filter 70 on which the trapped particulates are oxidized and reversing means 74 for reversing the exhaust gas upstream side and the exhaust gas downstream side of the particulate filter. The particulate filter has a trapping wall for trapping the particulates. The reversing means reverses the exhaust gas upstream side and the exhaust gas downstream side of the particulate filter so that the first trapping surface and the second trapping surface are used alternately to trap the particulates. The particulate filter has a first opening portion and a second opening portion through which the exhaust gas flows in and out from the particulate filter and is arranged in the exhaust pipe 71 upstream of the muffler. At least part of the circumferential portion of the particulate filter between the first opening portion and the second opening portion is in contact with the flow of the exhaust gas in the exhaust pipe.

12 Claims, 22 Drawing Sheets

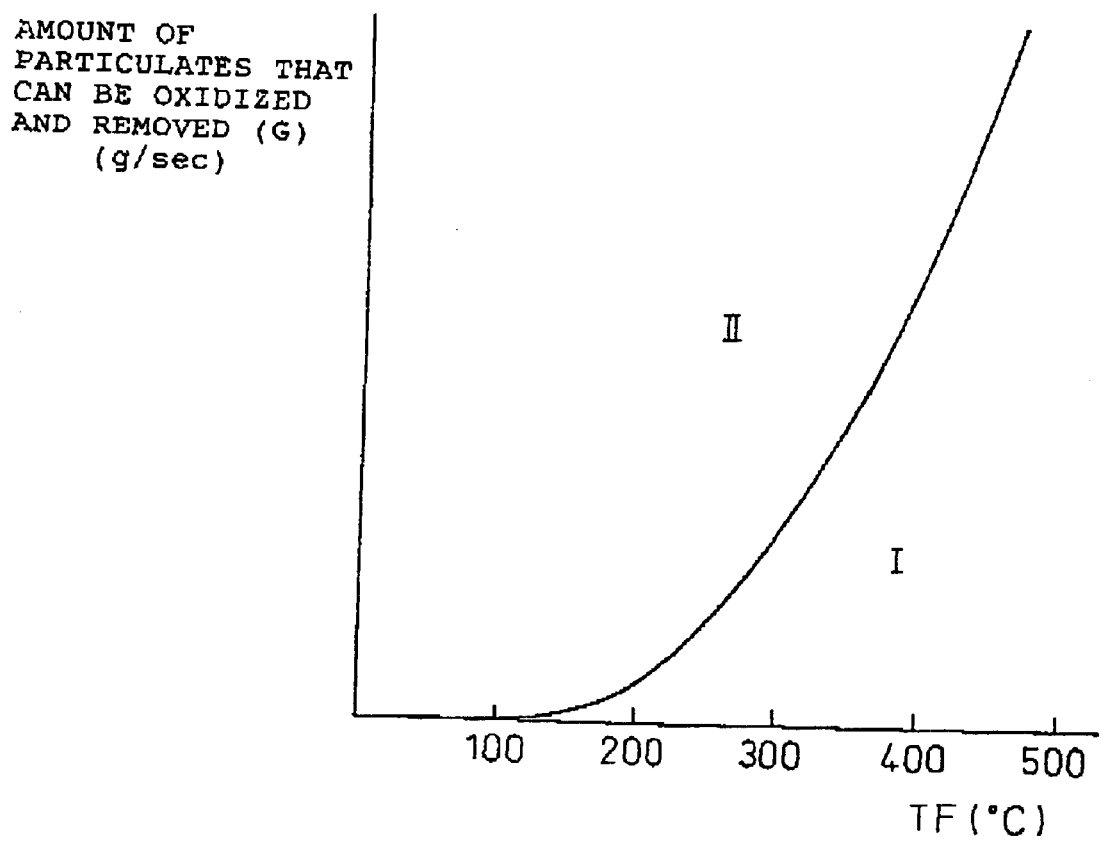

Fig. 25(A)
EXHAUST GAS FLOW
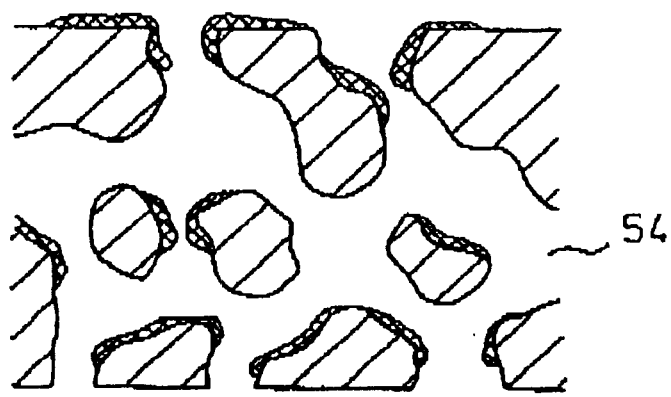
Fig. 25(B)
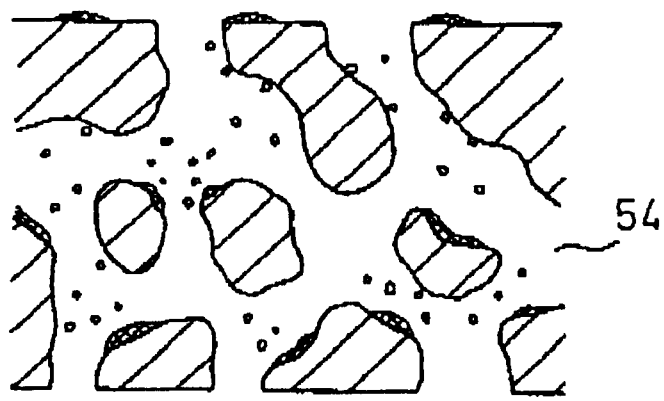
EXHAUST GAS FLOW

LIST OF REFERENCE NUMERALS

6 ··· FUEL INJECTOR
16 ··· THROTTLE VALVE
70 ··· PARTICULATE FILTER
71 ··· CHANGEOVER PORTION
73a ··· FIRST FLOW PASSAGE
73b ··· SECOND FLOW PASSAGE
73c ··· THIRD FLOW PASSAGE
74 ··· VALVE BODY

EXHAUST EMISSION CONTROL DEVICE OF INTERNAL COMBUSTION ENGINE

TECHNICAL FIELD

The present invention relates to a device for purifying the exhaust gas of an internal combustion engine.

BACKGROUND ART

The exhaust gas of an internal combustion engine and, particularly, of a diesel engine, contains particulates comprising carbon as a chief component. Particulates are harmful materials and thus it has been suggested that a particulate filter should be arranged in the exhaust system to trap particulates before they are emitted into the atmosphere. In such a particulate filter, the trapped particulates must be burned and removed to prevent resistance to the exhaust gas from increasing due to the blocked meshes.

In such a regeneration of the particulate filter, if the temperature of the particulates becomes about 600 degrees C., they ignite and burn. However, usually, the temperature of an exhaust gas of a diesel engine is considerably lower than 600 degrees C. and thus a heating means is required to heat the particulate filter itself.

Japanese Examined Patent Publication No. 7-106290 discloses that, if one of the platinum group metals and one of the oxides of the alkali earth metals are carried on the filter, the particulates on the filter burn and are removed successively at about 400 degrees C. 400 degrees C. is a typical temperature of the exhaust gas of a diesel engine.

However, when the above-mentioned filter is used, the temperature of the exhaust gas is not always about 400 degrees C. Further, a large amount of particulates can be discharged from the diesel engine according to an engine operating condition. Thus, particulates that cannot be burned and removed each time can deposit on the filter.

In this filter, if a certain amount of particulates deposits on the filter, the ability to burn and remove particulates drops so much that the filter cannot be regenerated by itself. Thus, if such a filter is merely arranged in the exhaust system, the blocking of the filter meshes can occur relative quickly.

DISCLOSURE OF THE INVENTION

Therefore, an object of the present invention is to provide a device, for purifying the exhaust gas of an internal combustion engine, which can oxidize and remove the trapped particulates on the particulate filter, and can prevent blocking of the particulate filter meshes.

According to the present invention, there is provided a device for purifying the exhaust gas of an internal combustion engine comprising a particulate filter on which the trapped particulates are oxidized and removed and a reversing means for reversing the exhaust gas upstream side and the exhaust gas downstream side of the particulate filter, wherein the particulate filter has a trapping wall for trapping the particulates, the trapping wall has a first trapping surface and a second trapping surface, the reversing means reverses the exhaust gas upstream side and the downstream side of the particulate filter so that the first trapping surface and the second trapping surf ace are used alternately to trap the particulates, the particulate filter has a first opening portion and a second opening portion through which the exhaust gas flows in and out from the particulate filter, the particulate filter is arranged in the exhaust pipe, and at least part of the circumferential portion of the particulate filter between the first opening portion and the second opening portion is contact with the flow of the exhaust gas in the exhaust pipe.

BRIEF DESCRIPTION OF THE DRAWINGS

FIG. 6 is a view showing the amounts of produced smoke, $NO_x$, and the like;

FIG. 13 is a view showing the opening degree of the throttle valve and the like;

FIG. 22 is a view showing the relationship between the amount of particulates that can be oxidized and removed and the temperature of the particulate filter;

FIGS. 25(A) and 25(B) are enlarged sectional views of the partition wall of the particulate filter with the residual particulates;

BEST MODE FOR CARRYING OUT THE INVENTION

Figure 1:
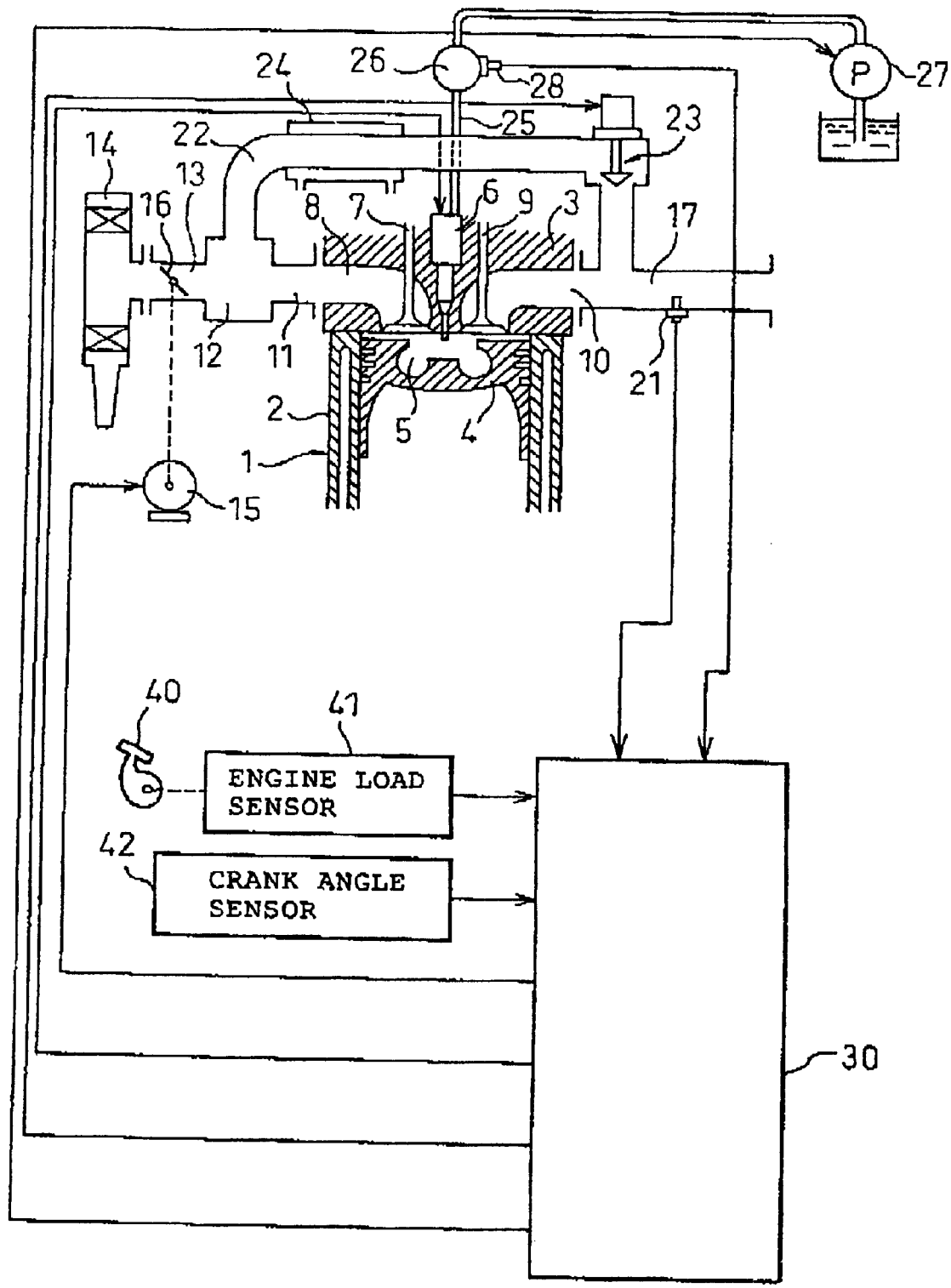
FIG. 1 is a schematic vertical sectional view of a diesel engine with a device for purifying the exhaust gas according to the present invention.
Figure 2:
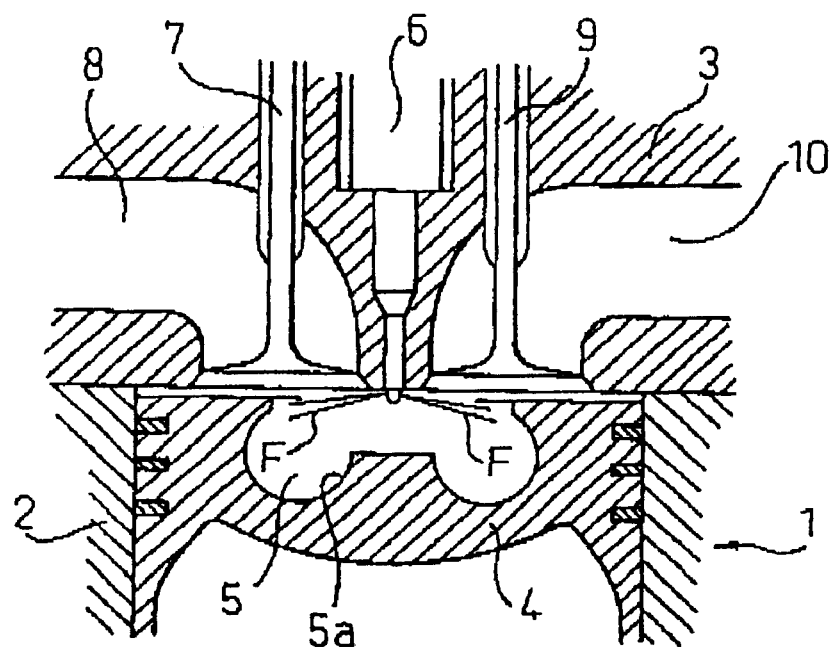
FIG. 2 is an enlarged vertical sectional view of the combustion chamber of FIG. 1.
Figure 3:
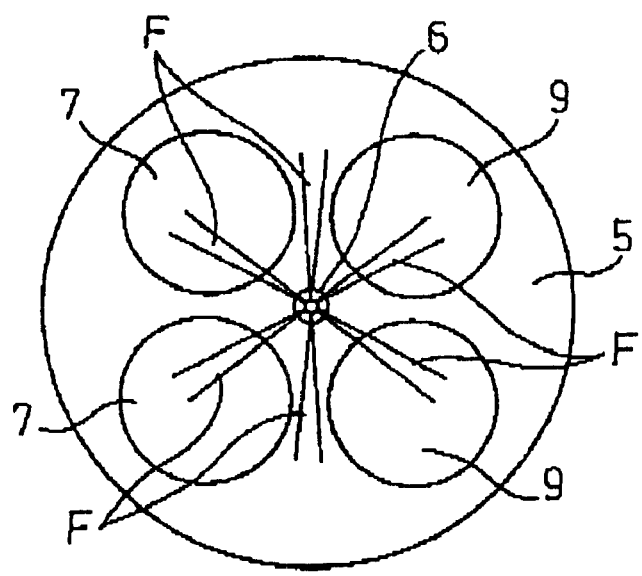
FIG. 3 is a bottom view of the cylinder-bead of FIG. 1.

FIG. 1 is a schematic vertical sectional view of a four-stroke diesel engine with a device for purifying the exhaust gas according to the present invention. FIG. 2 is an enlarged vertical sectional view of a combustion chamber of diesel engine of FIG. 1. FIG. 3 is a bottom view of a cylinder-head of diesel engine of FIG. 1. Referring FIGS. 1–3, reference numeral 1 designates an engine body, reference numeral 2 designates a cylinder-block, reference numeral 3 designates a cylinder-head, reference numeral 4 designates a piston, reference numeral 5a designates a cavity formed on the top surface of piston 4, reference numeral 5 designates a combustion chamber formed in the cavity 5a, reference numeral 6 designates an electrically controlled fuel injector, reference numeral 7 designates a pair of intake valves, reference numeral 8 designates an intake port, reference numeral 9 designates a pair of exhaust valves, and reference numeral 10 designates an exhaust port. The intake port 8 is connected to a surge tank 12 via a corresponding intake tube 11. The surge tank 12 is connected to an air-cleaner 14 via an intake duct 13. A throttle valve 16 driven by an electric motor 15 is arranged in the intake duct 13. On the other hand, the exhaust port 10 in connected to an exhaust manifold 17.

As shown in FIG. 1, an air-fuel ratio sensor 21 is arranged in the exhaust manifold 17. The exhaust manifold 17 and the surge tank 12 are connected with each other via an EGR passage 22. An electrically controlled EGR control valve 23 is arranged in the EGR passage 22. An EGR cooler 24 is arranged around the EGR passage 22 to cool the EGR gas flowing in the EGR passage 22. In the embodiment of FIG. 1, the engine cooling water is led into the EGR cooler 24 and thus the EGR gas is cooled by the engine cooling water.

On the other hand, each fuel injector 6 is connected to the fuel reservoir, that is, a common rail 26 via a fuel supply tube 25. Fuel is supplied to the common rail 26 from an electrically controlled variable discharge fuel pump 27. Fuel supplied in the common rail 26 is supplied to the fuel injector 6 via each fuel supply tube 25. A fuel pressure sensor 28 for detecting a fuel pressure in the common rail 26 is attached to the common rail 26. The discharge amount of the fuel pump 27 is controlled on the basis of an output signal of the fuel pressure sensor 28 such that the fuel pressure in the common rail 26 becomes the target fuel pressure.

Reference numeral 30 designates an electronic control unit. The output signals of the air-fuel sensor 21 and the fuel pressure sensor 28 are input thereto. An engine load sensor 41 is connected to the accelerator pedal 40, which generates an output voltage proportional to the amount of depression (L) of the accelerator pedal 40. The output signal of the engine load sensor 41 is also input to the electronic control unit 30. Further, the output signal of a crank angle sensor 42 for generating an output pulse each time the crankshaft rotates by, for example, 30 degrees is also input thereto.

Thus, the electronic control unit 30 actuates the fuel injector 6, the electronic motor 15, the EGR control valve 23, and the fuel pump 27 on the basis of the input signals.

As shown in FIGS. 2 and 3, in the embodiment of the present invention, the fuel injector 6 comprises of a nozzle having six nozzle holes. Fuel sprays (F) are injected from the nozzle holes in slightly downward direction against a horizontal plane with equal angular intervals. As shown in FIG. 3, two fuel sprays (F) of the six fuel sprays (F) are scattered along the lower surface of each exhaust valve 9. FIGS. 2 and 3 show the case where fuel is injected at the end of the compression stroke. In this case, the fuel sprays (F) progress toward the inside periphery surface of the cavity 5 and thereafter are ignited and burned.

Figure 4:
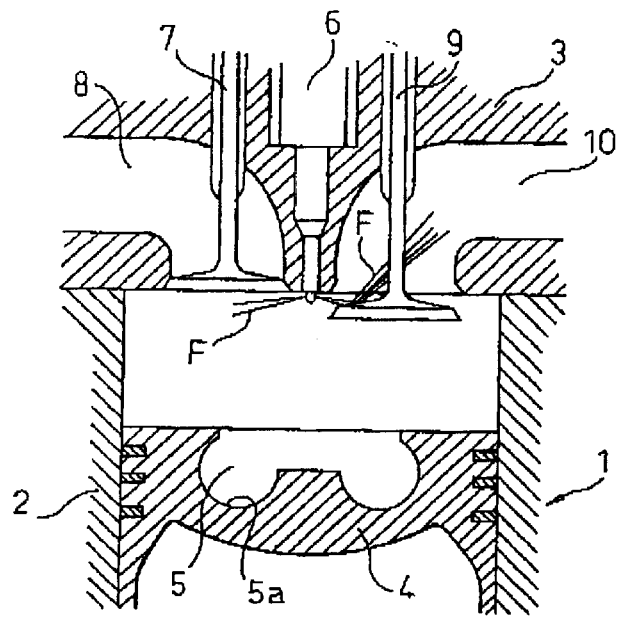
FIG. 4 is a side sectional view of the combustion chamber.
Figure 5:
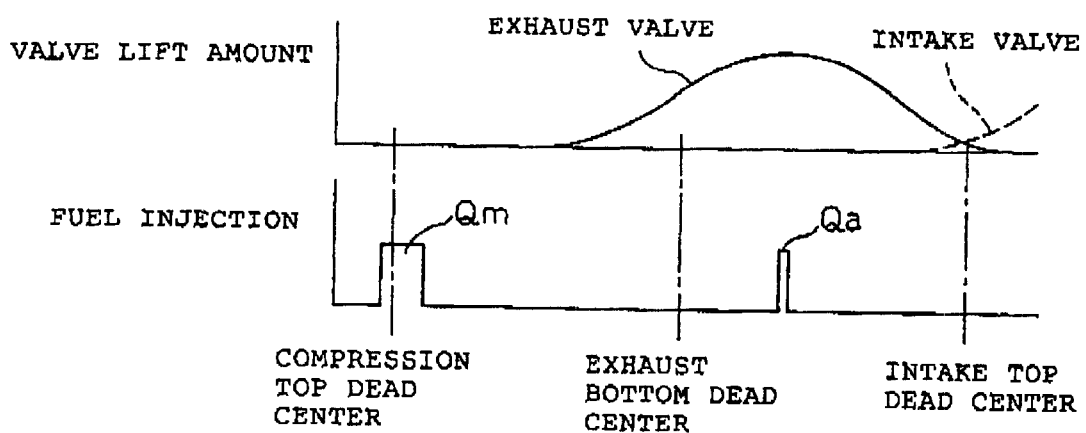
FIG. 5 is a view showing the relationship between the lifting amounts of the intake valve and the exhaust valve and the fuel injection.

FIG. 4 shows the case where additional fuel is injected from the fuel injector 6 when the lifting amount of the exhaust valves 9 is the maximum in the exhaust stroke. That is, FIG. 5 shows the case where the main fuel injection (Qm) is carried out close to the compression top dead center and thereafter the additional fuel injection (Qa) is carried out in the middle stage of the exhaust stroke. In this case, the fuel sprays (F) that progress toward the exhaust valves 9 are directed between the umbrella-like back surface of the exhaust valve 9 and the exhaust port 10. In other words, two nozzle holes, of the six nozzle holes of the fuel injector 6, are formed such that when the exhaust valves 9 are opened and the additional fuel injection (Qa) is carried out, the fuel sprays (F) are directed between the back surface of the exhaust valve 9 and the exhaust port 10. In the embodiment of FIG. 4, these fuel sprays (F) impinge the back surface of the exhaust valve 9 and are reflected from the back surface of the exhaust valves 9, and thus are directed into the exhaust port 10.

Figure 6:
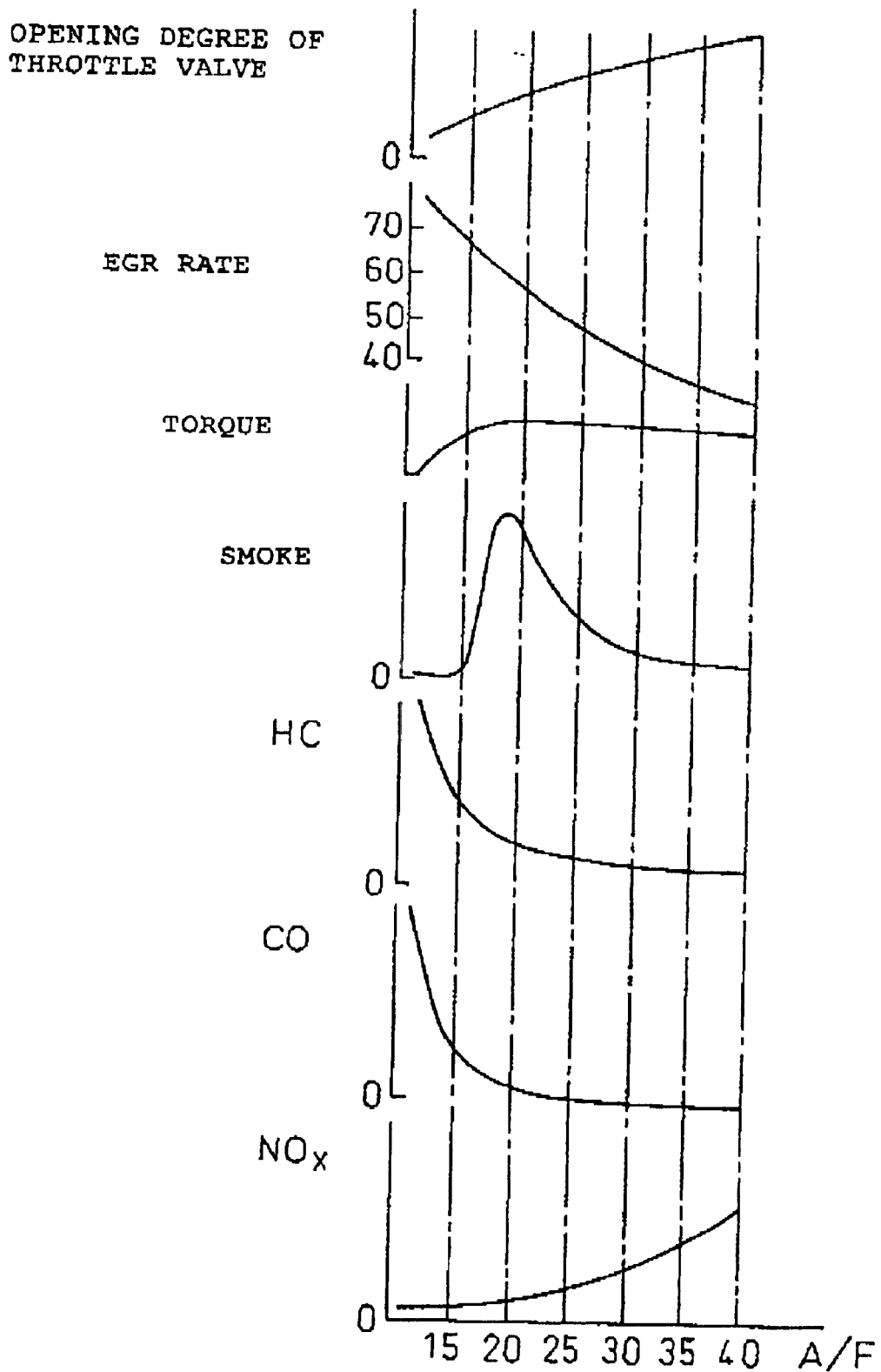

Usually, the additional fuel injection (Qa) is not carried out, and the main fuel injection (Qm) only is carried out. FIG. 6 indicates an example of an experiment showing the change in the output torque and the amount of smoke, HC, CO, and $NO_x$ exhausted at that time when changing the air-fuel ratio A/F (abscissa in FIG. 6) by changing the opening degree of the throttle valve 16 and the EGR rate at the time of low engine load operation. As will be understood from FIG. 6, in this experiment, the smaller the air fuel ratio A/F becomes, the larger the EGR rate becomes. When the air-fuel ratio is below the stoichiometric air-fuel ratio (nearly equal 14.6), the EGR rate becomes over 65 percent.

As shown in FIG. 6, if the EGR rate is increased to reduce the air-fuel ratio A/F, when the EGR rate becomes close to 40 percent and the air-fuel ratio A/F becomes about 30, the amount of produced smoke starts to increase. Next, when the EGR rate is further increased and the air-fuel ratio A/F is made smaller, the amount of produced smoke sharply increases and peaks. Next, when the EGR rate is further increased and the air-fuel ratio A/F is made smaller, the amount of produced smoke sharply decreases when the EGR rate is made over 65 percent and the air-fuel ratio A/F becomes close to 15.0, the amount of produced smoke is substantially zero. That is, almost no soot is produced. At this time, the output torque of the engine falls somewhat and the amount of produced $NO_x$ becomes considerably lower. On the other hand, at this time, the amounts of produced HC and CO start to increase.

Figure 7A:
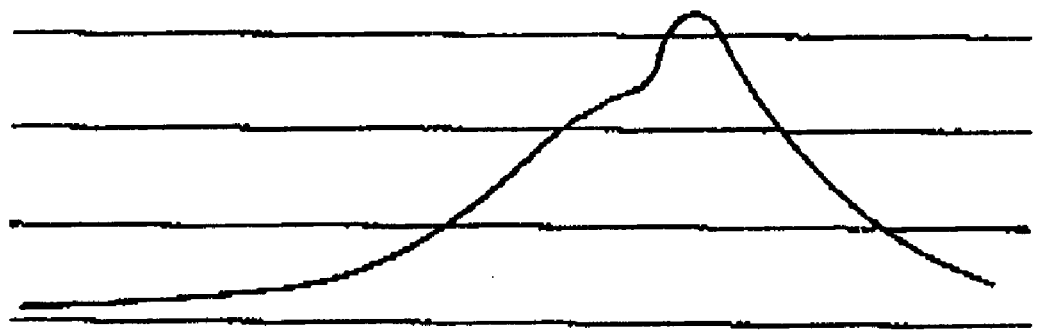
FIG. 7(A) is a view showing the change in the combustion pressure when the amount of produced smoke is the greatest near an air-fuel ratio of 21.
Figure 7B:
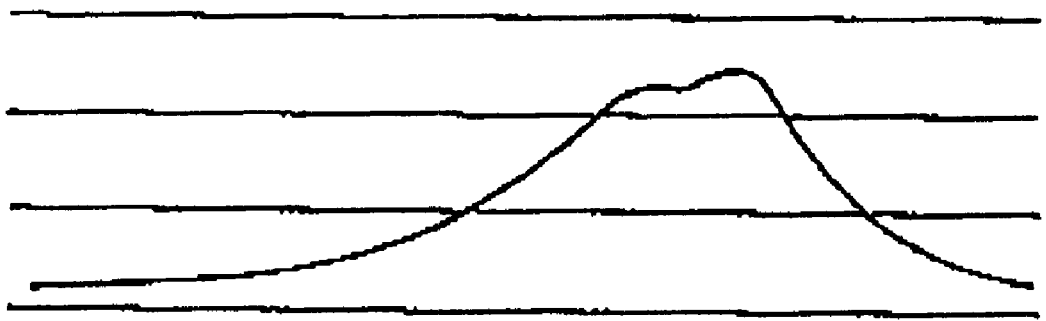
FIG. 7(B) is a view showing the change in the combustion pressure when the amount of produced smoke is substantially zero near an air-fuel ratio of 18.

FIG. 7(A) shows the change in combustion pressure in the combustion chamber S when the amount of produced smoke is the greatest near an air-fuel ratio A/F of 21. FIG. 7(B) shows the change in combustion pressure in the combustion chamber 5 when the amount of produced smoke is substantially zero near an air-fuel ratio A/F of 18. As will be understood from a comparison of FIG. 7(A) and FIG. 7(B), the combustion pressure is lower in the case shown in FIG. 7(B) where the amount of produced smoke is substantially zero than the case shown in FIG. 7(A) where the amount of produced smoke is large.

The following may be said from the results of the experiment shown in FIGS. 6 and 7. That is, first, when the air-fuel ratio A/F is less than 15.0 and the amount of produced smoke is substantially zero, the amount of produced $NO_x$ decreases considerably as shown in FIG. 6. The fact that the amount of produced $NO_x$ decreases means that the combustion temperature in the combustion chamber 5 falls. Therefore, it can be said that when almost no soot is produced, the combustion temperature in the combustion chamber 5 becomes lower. The same fact can be said from FIG. 7. That is, in the state shown in FIG. 7(B) where almost no soot is produced, the combustion pressure becomes lower, therefore the combustion temperature in the combustion chamber 5 becomes lower at this time.

Figure 8:
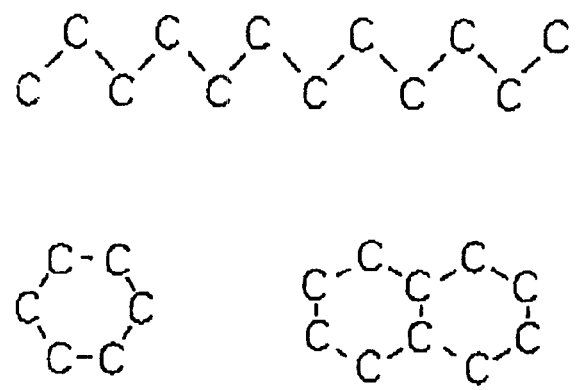
FIG. 8 is a view showing the fuel molecules.

Second, when the amount of produced smoke, that is, the amount of produced soot, becomes substantially zero, as shown in FIG. 6, the amounts of exhausted HC and CO increase. This means that the hydrocarbons are exhausted without changing into soot. That is, the straight chain hydrocarbons and aromatic hydrocarbons contained in the fuel and shown in FIG. 8 decompose when raised in temperature in an oxygen insufficient state resulting in the formation of a precursor of soot. Next, soot mainly composed of solid masses of carbon atoms is produced. In is this case, the actual process of production of soot is complicated. How the precursor of soot is formed is not clear, but whatever the case, the hydrocarbons shown in FIG. 8 change to soot through the soot precursor. Therefore, as explained above, when the amount of production of soot becomes substantially zero, the amount of exhaust of HC and Co increases as shown in FIG. 6, but the HC at this time is a soot precursor or in a state of hydrocarbon before that.

Summarizing these considerations based on the results of the experiments shown in FIGS. 6 and 7, when the combustion temperature in the combustion chamber 5 is low, the amount of produced soot becomes substantially zero. At this time, a soot precursor or a state of hydrocarbons before that is exhausted from the combustion chamber 5. More detailed experiments and studies were conducted. As a result, it was learned that when the temperature of the fuel and the gas around the fuel in the combustion chamber 5 is below a certain temperature, the process of growth of soot stops midway, that is, no soot at all is produced and that when the temperature of the fuel and the gas around the fuel in the combustion chamber 5 becomes higher than the certain temperature, soot is produced.

The temperature of the fuel and the gas around the fuel when the process of growth of hydrocarbons stops in the state of the soot precursor, that is, the above certain temperature, changes depending on various factors such as the type of the fuel, the air-fuel ratio, and the compression ratio, so it cannot be said what degree it is, but this certain temperature is deeply related to the amount of production of $NO_x$. Therefore, this certain temperature can be defined to a certain degree from the amount of production of $NO_x$. That is, the greater the EGR rate is, the lower the temperature of the fuel, and the gas around it at the time of combustion, becomes and the lower the amount of produced $NO_x$ becomes. At this time, when the amount of produced $NO_x$ becomes around 10 ppm or less, almost no soot is produced any more. Therefore, the above certain temperature substantially corresponds to the temperature when the amount of produced $NO_x$ becomes around 10 ppm or less.

Once soot is produced, it is impossible to purify it by after-treatment using a catalyst having an oxidation function. As opposed to this, a soot precursor or a state of hydrocarbons before that can be easily purified by after-treatment using a catalyst having an oxidation function. Thus, it is extremely effective for the purifying of the exhaust gas that the hydrocarbons are exhausted from the combustion chamber 5 in the form of a soot precursor or a state before that with the reduction of the amount of produced $NO_x$.

Now, to stop the growth of hydrocarbons in the state before the production of soot, it is necessary to suppress the temperature of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression the temperatures of the fuel and the gas around it.

That is, if only air exists around the fuel, the vaporized fuel will immediately react with the oxygen in the air and burn. In this case, the temperature of the air away from the fuel does not rise so much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when fuel exists in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises so much. That is, the combustion temperature can be kept low. That is, the presence of inert gas plays an important role in the suppression of the combustion temperature. It is possible to keep the combustion temperature low by the heat absorbing action of the inert gas.

In this case, to suppress the temperature of the fuel and the gas around it to a temperature lower than the temperature at which soot is produced, an amount of inert gas enough to absorb an amount of heat sufficient for lowering the temperatures is required. Therefore, if the amount of fuel increases, the amount of required inert gas increases with this. Note that, in this case, the larger the specific heat of the inert gas is, the stronger the heat absorbing action becomes. Therefore, a gas with a large specific heat is preferable as the inert gas. In this regard, since $CO_2$ and EGR gas have relatively large specific heats, it may be said to be preferable to use EGR gas as the inert gas.

Figure 9:
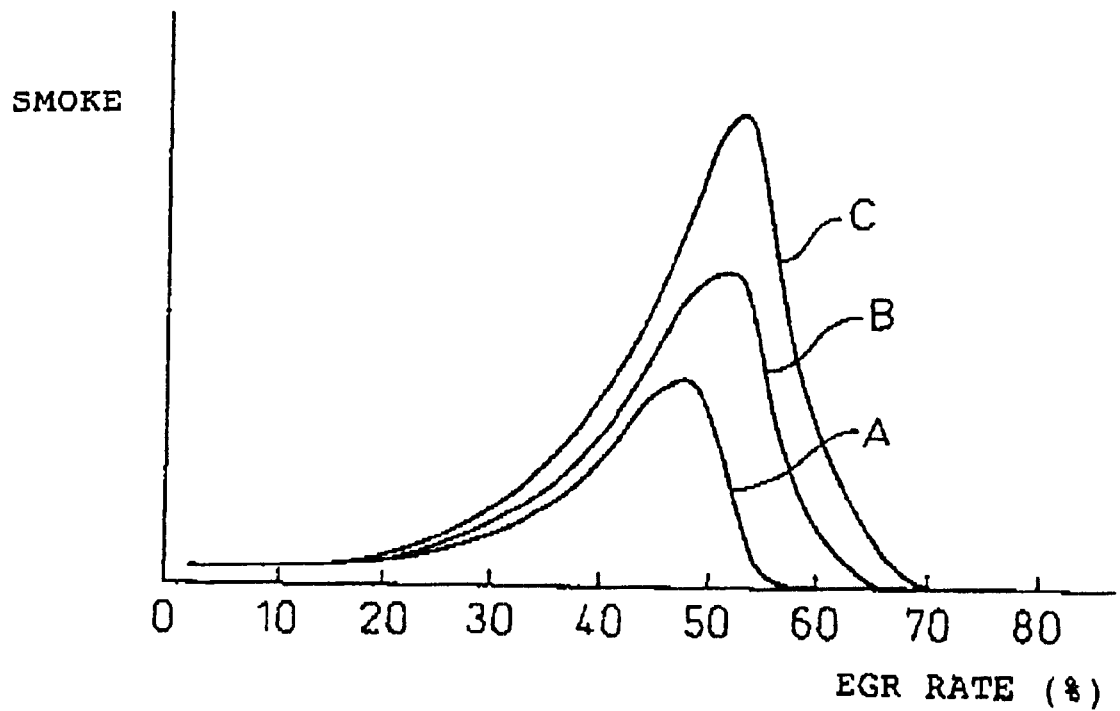
FIG. 9 is a view showing the relationship between the amount of produced smoke and the EGR rate.

FIG. 9 shows the relationship between the EGR rate and smoke when using EGR gas as the inert gas and changing the degree of cooling of the EGR gas. That is, the curve (A) in FIG. 9 shows the case of strongly cooling the EGR gas and maintaining the temperature of the EGR gas at about 90 degrees C., the curve (B) shows the case of cooling the EGR gas by a compact cooling apparatus, and the curve (C) shows the case of not compulsorily cooling the EGR gas.

When strongly cooling the EGR gas as shown by the curve (A) in FIG. 9, the amount of produced soot peaks when the EGR rate is a slightly below 50 percent. In this case, if the EGR rate is made about 55 percent or higher, almost no soot is produced any longer. On the other hand, when the EGR gas is slightly cooled as shown by the curve (B) in FIG. 9, the amount of produced soot peaks when the EGR rate is slightly higher than 50 percent. In this case, if the EGR rate is made above about 65 percent, almost no soot is produced.

Further, when the EGR gas is not forcibly cooled as shown by the curve (C) in FIG. 9, the amount of produced soot peaks near an EGR rate of 55 percent. In this case, if the EGR rate is made over about 70 percent, almost no soot is produced. Note that FIG. 9 shows the amount of produced smoke when the engine load is relatively high. When the engine load becomes smaller, the EGR rate at which the amount of produced soot peaks falls somewhat, and the lower limit of the EGR rate, at which almost no soot is produced, also falls somewhat. In this way, the lower limit of the EGR rate at which almost no soot is produced changes in accordance with the degree of cooling of the EGR gas or the engine load.

Figure 10:
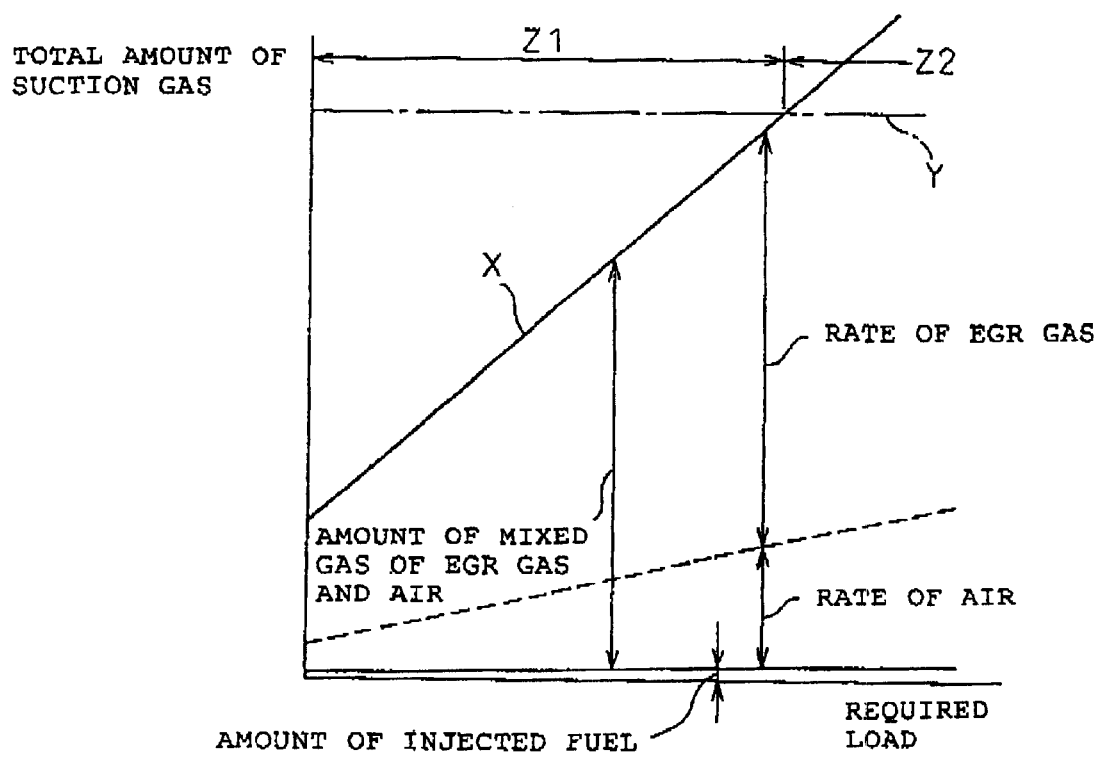
FIG. 10 is a view showing the relationship between the amount of injected fuel and the amount of mixed gas.

FIG. 10 shows the amount of mixed gas of EGR gas and air, the ratio of air in the mixed gas, and the ratio of EGR gas in the mixed gas, required to make the temperature of the fuel and the gas around it, at the time of combustion, a temperature lower than the temperature at which soot is produced in the case of the use of EGR gas as an inert gas. Note that, in FIG. 10, the ordinate shows the total amount of suction gas taken into the combustion chamber 5. The broken line (Y) shows the total amount of suction gas able to be taken into the combustion chamber 5 when supercharging is not being performed. Further, the abscissa shows the required load. (Z1) shows the low engine load operation region, Referring to FIG. 10, the ratio of air, that is, the amount of air in the mixed gas shows the amount of air necessary for causing the injected fuel to completely burn. That is, in the case shown in FIG. 10, the ratio of the amount of air and the amount of injected fuel becomes the stoichiometric air-fuel ratio. On the other hand, in FIG. 10, the ratio of EGR gas, that is, the amount of EGR gas in the mixed gas, shows the minimum amount of EGR gas required for making the temperature of the fuel and the gas around it a temperature lower than the temperature at which soot is produced when the injected fuel has burned completely. This amount of EGR gas is, expressed in term of the EGR rate, equal to or larger than 55 percent, in the embodiment shown in FIG. 10, it is equal to or larger than 70 percent. That is, if the total amount of suction gas taken into the combustion chamber 5 is made the solid line (X) in FIG. 10 and the ratio between the amount of air and the amount of EGR gas in the total amount of suction gas (X) is made the ratio shown in FIG. 10, the temperature of the fuel and the gas around it becomes a temperature lower than the temperature at which soot is produced and therefore no soot at all is produced. Further, the amount of produced $NO_x$ at this time is about 10 ppm or less and therefore the amount of produced $NO_x$ becomes extremely small.

If the amount of injected fuel increases, the amount of generated heat at the time of combustion increases, so to maintain the temperature of the fuel and the gas around it at a temperature lower than the temperature at which soot is produced, the amount of heat absorbed by the EGR gas must be increased. Therefore, as shown in FIG. 10, the amount of EGR gas has to be increased with an increase in the amount of injected fuel. That is, the amount of EGR gas has to be increased as the required engine load becomes higher.

On the other hand, in the engine load region (Z2) of FIG. 10, the total amount of suction gas (X) required for inhibiting the production of soot exceeds the total amount of suction gas (Y) that can be taken in. Therefore, in this case, to supply the total amount of suction gas (x), required for inhibiting the production of soot, into the combustion chamber 5, it is necessary to supercharge or pressurize both the EGR gas and the intake air or just the EGR gas. When not supercharging or pressurizing the EGR gas etc., in the engine load region (Z2), the total amount of suction gas (X) corresponds to the total amount of suction gas (Y) that can be taken in. Therefore, in this case, to inhibit the production of soot, the amount of air is reduced somewhat to increase the amount of EGR gas and the fuel is made to burn in a state where the air-fuel ratio is rich.

As explained above, FIG. 10 shows the case of combustion of fuel at the stoichiometric air-fuel ratio. In the low engine load operating region (Z1) shown in FIG. 10, even if the amount of air is made smaller than the amount of air shown in FIG. 10, that is, even if the air-fuel ratio is made rich, it is possible to inhibit the production of soot and make the amount of produced $NO_x$ around 10 ppm or less. Further, in the low engine load operating region (Z1) shown in FIG. 10, even of the amount of air is made greater than the amount of air shown in FIG. 10, that is, the average of air-fuel ratio is made lean at 17 to 18, it is possible to inhibit the production of soot and make the amount of produced $NO_x$ around 10 ppm or less.

That is, when the air-fuel ratio is made rich, the fuel is in excess, but since the combustion temperature is suppressed to a low temperature, the excess fuel does not change into soot and therefore soot is not produced. Further, at this time, only an extremely small amount of $NO_x$ is produced. On the other hand, when the average of air-fuel ratio is lean or when the air-fuel ratio is the stoichiometric air-fuel ratio, a small amount of soot is produced it the combustion temperature becomes higher, but the combustion temperature is suppressed to a low temperature, and thus no soot at all is produced. Further, only an extremely small amount of $NO_x$ is produced.

In this way, in the low engine load operating region (Z1), despite the air-fuel ratio, that is, whether the air fuel ratio is rich or the stoichiometric air-fuel ratio, or the average air-fuel ratio is lean, no soot is produced and the amount of produced $NO_x$ becomes extremely small. Therefore, considering the improvement of the fuel consumption rate, it may be said to be preferable to make the average of air-fuel ratio lean.

By the way, only when the engine load is relative low and the amount of generated heat is small, can the temperature of the fuel and the gas around the fuel in the combustion be suppressed to below a temperature at which the process of growth of soot stops midway. Therefore, in the embodiment of the present invention, when the engine load is relative low, the temperature of the fuel and the gas around the fuel in the combustion is suppressed to below a temperature at which the process of growth of soot stops midway and thus a first combustion, i.e., a low temperature combustion is carried out. When the engine load is relative high, a second combustion, i.e., normal combustion as usual is carried out. Here, as can be understood from the above explanation, the first combustion, i.e., the low temperature combustion is a combustion in which the amount of inert gas in the combustion chamber is larger than the worst amount of inert gas causing the maximum amount of produced soot and thus no soot at all is produced. The second combustion, i.e., the normal combustion is a combustion in which the amount of inert gas in the combustion chamber is smaller than the worst amount of inert gas.

Figure 11:
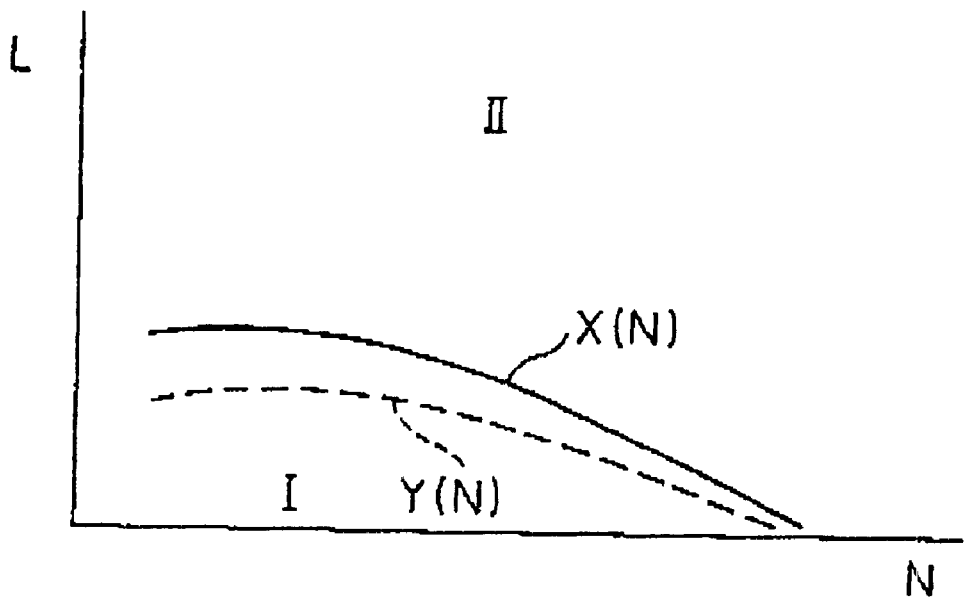
FIG. 11 is a view showing the first operating region (I) and the second operating region (II)

FIG. 11 shows a first operating region (I) in which the first combustion, i.e., the low temperature combustion is carried out and a second operating region (II) in which the second combustion, i.e., the normal combustion is carried out. In FIG. 11, the ordinate (L) shows the amount of depression of the accelerator pedal 40, i.e., the required engine load. The abscissa (N) shows the engine speed. Further, in FIG. 11, X(N) shows a first boundary between the first operating region (I) and the second operating region (II). Y(N) shows a second boundary between the first operating region (I) and the second operating region (II). The decision of changing from the first operating region (I) to the second operating region (II) is carried out on the basis of the first boundary X(N). The decision of changing from the second operating region (II) to the first operating region (I) is carried out on the basis of the second boundary Y(N).

That is, when the engine operating condition is in the first operating region (I) and the low temperature combustion is carried out, if the required engine load (L) increases beyond the first boundary X(N) that is a function of the engine speed (N), it is determined that the engine operating region shifts in the second operating region (II) and thus the normal combustion is carried out. Thereafter, if the required engine load (L) decreases below the second boundary Y(N) that is a function of the engine speed (N), it is determined that the engine operating region shifts in the first operating region (I) and thus the low temperature combustion is carried out again.

Figure 12:
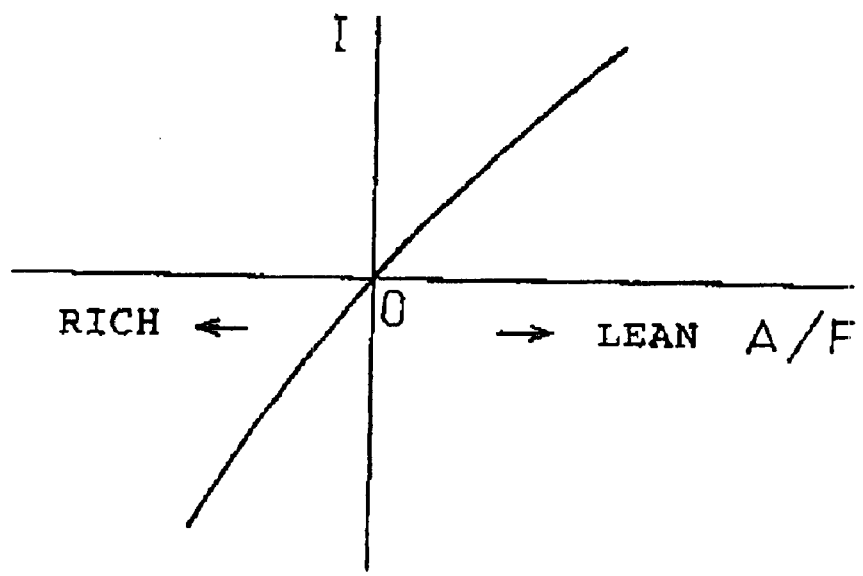
FIG. 12 is a view showing the output of the air-fuel ratio sensor.

FIG. 12 shows the output of the air-fuel ratio sensor 21. As shown in FIG. 12, the output current (I) of the air-fuel ratio sensor 21 changes in accordance with the air-fuel ratio A/F. Accordingly, the air-fuel ratio can be known from the output current (I) of the air-fuel ration sensor 21. Next, referring FIG. 13, the engine operating control in the first operating region (I) and the second operating region (II) will be explained schematically.

Figure 13:
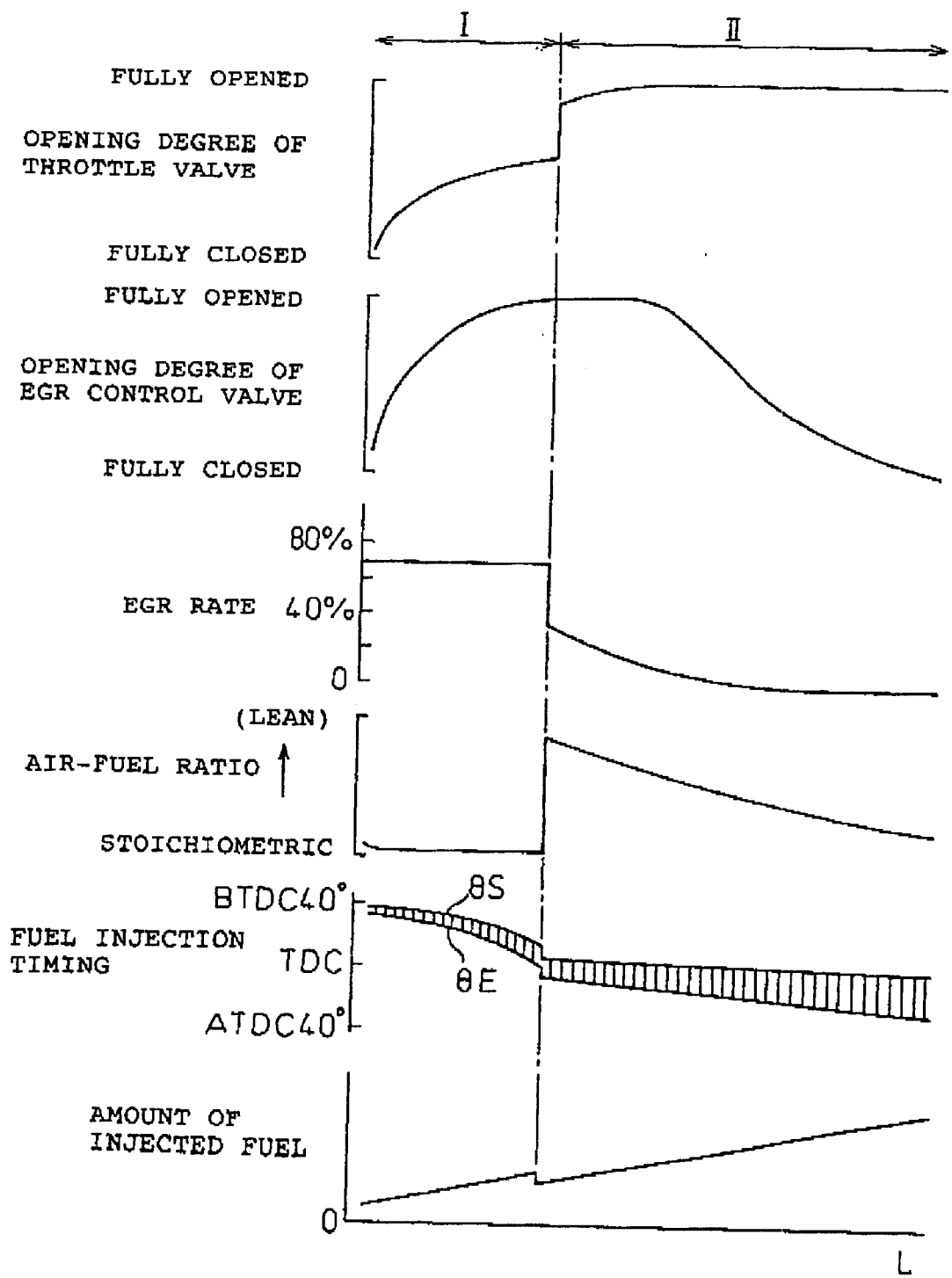

FIG. 13 shows the opening degree of the throttle valve 16, the opening degree of the EGR control valve 23, the EGR rate, the air-fuel ratio, the fuel injection timing, and the amount of injected fuel with respect to the required engine load (L). As shown in FIG. 13, in the first operating region (I) when the required engine load (L) is low, the throttle valve 16 is gradually opened from near the fully closed state to near the half opened state along with an increase in the required engine load (L), and the EGR control valve 23 is gradually opened from near the fully closed state to the fully opened state along with an increase in the required engine load (L). In the embodiment shown in FIG. 13, the EGR rate in the first operating region (I) is made about 70 percent and the air-fuel ratio therein is made slightly lean.

In the other words, in the first operating region (I), the opening degrees of the throttle valve 16 and the EGR control valve 23 are controlled such that the EGR rate becomes about 70 percent and the air-fuel ratio becomes a slightly lean air-fuel ratio. The air-fuel ratio at this time is controlled to the target air-fuel ratio to correct the opening degree of the EGR control valve 23 on the basis of the output signal of the air-fuel ratio sensor 21. In the first operating region (I), the fuel is injected before the compression top dead center TDC. In this case, the starting time (θS) of fuel injection is delayed along with an increase in the required engine load (L) and the ending time (θE) of fuel injection is delayed along with the delay of the starting time (θS) of fuel injection.

When in the idle operating mode, the throttle valve 16 is closed to near the fully closed state. In this time, the EGR control valve 23 is also closed near the fully closed state. When the throttle valve 16 is closed to near the fully closed state, the pressure in the combustion chamber 5 in the initial stage of the compression stroke is made low and thus the compression pressure becomes low. When the compression pressure becomes low, the compression work of the piston 4 becomes small and thus the vibration of the engine body 1 becomes small. That is, when in the idle operating mode, the throttle valve 16 is closed near the fully closed state to restrain the vibration of the engine body 1.

On the other hand, when the engine operating region changes from the first operating region (I) to the second operating region (II), the opening degree of the throttle valve 16 increases by a step from the half opened state toward the fully opened state. In this time, in the embodiment shown in FIG. 13, the EGR rate decreases by a step from about 70 percent to below 40 percent and the air-fuel ratio increases by a step. That is, the EGR rate jumps beyond the EGR rate extent (FIG. 9) in which the large amount of smoke is produced and thus a large amount of smoke is not produced when the engine operating region changes from the first operating region (I) to the second operating region (II).

In the second operating region (II), the normal combustion as usual is carried out. This combustion causes some production of soot and $NO_x$. However, the thermal efficiency thereof is higher than that of the low temperature combustion. Thus, when the engine operating region changes from the first operating region (I) to the second operating region (II), the amount of injected fuel decreases by a step as shown in FIG. 13.

In the second operating region (II), the throttle valve 16 is held in the fully opened state except in a part thereof. The opening degree of the EGR control valve 23 decreases gradually along with an increase in the required engine load (L). In this operating region (II), the EGR rate decreases along with an increase in the required engine load (L) and the air-fuel ratio decreases along with an increase in the required engine load (L). However, the air-fuel ratio is made a lean air-fuel ratio even it the required engine load (L) becomes high. Further, in the second operating region (II), the starting time (θS) of fuel injection is made near the compression top dead center TDC.

Figure 14:
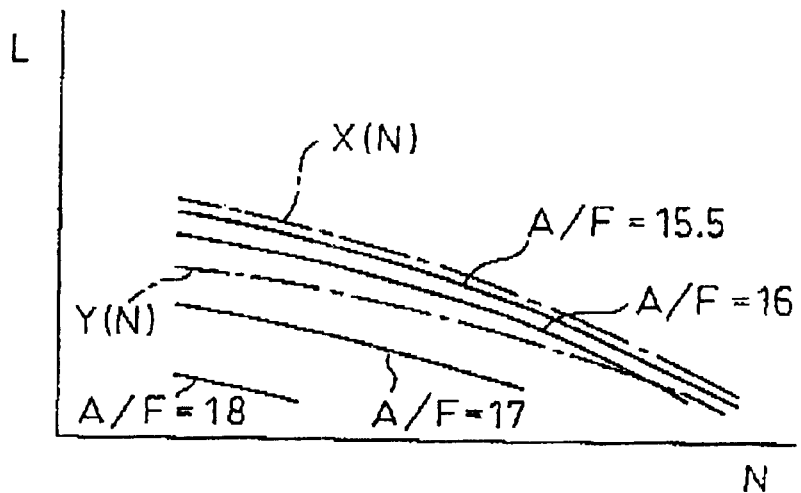
FIG. 14 is a view showing the air-fuel ratio in the first operating region (I)

FIG. 14 shows the air-fuel ratios A/F in the first operating region (I). In FIG. 14, the curves indicated by A/F=15.5, A/P=16, A/F=17, and A/F=18 shows respectively the cases in that the air-fuel ratios are 15.5, 16, 17, and 18. The air-fuel ratio between two of the curves is defined by the proportional allotment. As shown in FIG. 14, in the first operating region (I), the air-fuel ratio is lean and the lower the required engine load (L) becomes, the more the air-fuel ratio is lean.

That is, the amount of generated heat in the combustion decreases along with a decrease in the required engine load (L). Therefore, even if the EGR rate decreases along with a decrease in the required engine load (L), the low temperature combustion can be carried out. When the EGR rate decreases, the air-fuel ratio becomes large. Therefore, as shown in FIG. 14, the air-fuel ratio A/F increases along with a decrease in the required engine load (L). The larger the air-fuel ratio becomes, the more the fuel consumption improves. Accordingly, in the present embodiment, the air-fuel ratio A/F increases along with a decrease in the required engine load (L) such that the air-fuel ratio is made lean as much as possible.

Figure 15A:
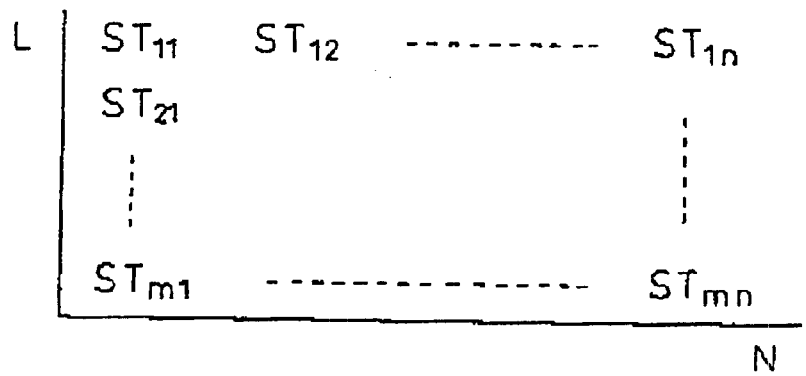
FIG. 15(A) is a view showing the target opening degree of the throttle valve.
Figure 15B:
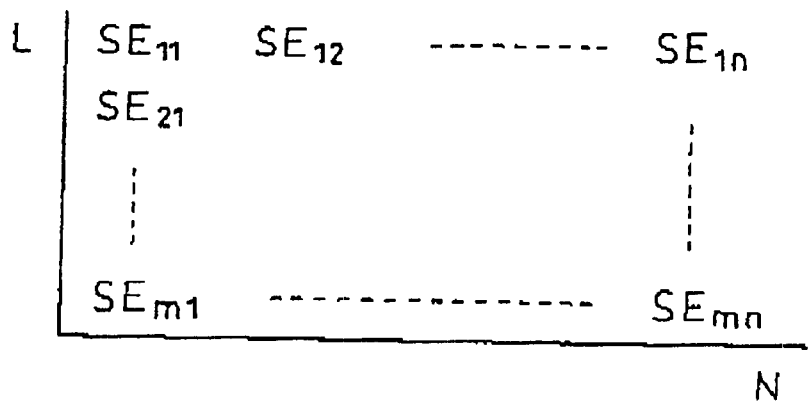
FIG. 15(B) is a view showing the target opening degree of the EGR control valve.

A target opening degree (ST) of the throttle valve 16 required to make the air-fuel ratio the target air-fuel ratio shown in FIG. 14 is memorized in ROM of the electronic control unit as a map in which it is a function of the required engine load (L) and the engine speed (N) shown in FIG. 15(A). A target opening degree (SE) of the EGR control valve 23 required to make the air-fuel ratio the target air-fuel ratio shown in FIG. 14 is memorized in ROM of the electronic control unit as a map in which it is a function of the required engine load (L) and the engine speed (N) shown in FIG. 15(B).

Figure 16:
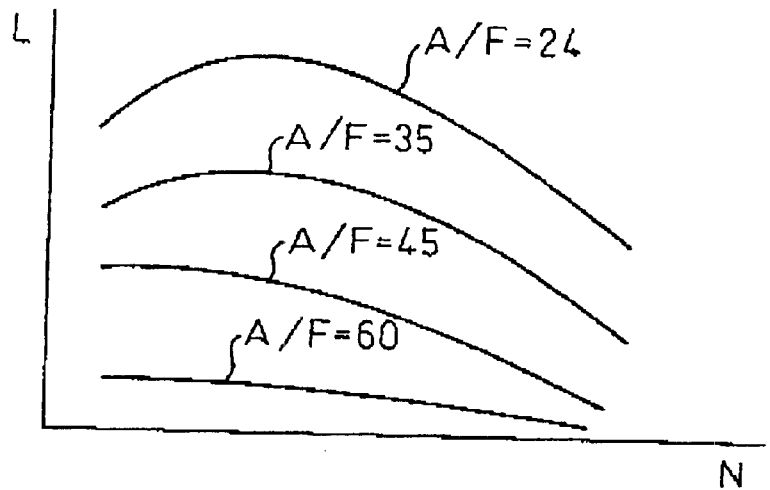
FIG. 16 is a view showing the air-fuel ratio in the second operating region (II)
Figure 17A:
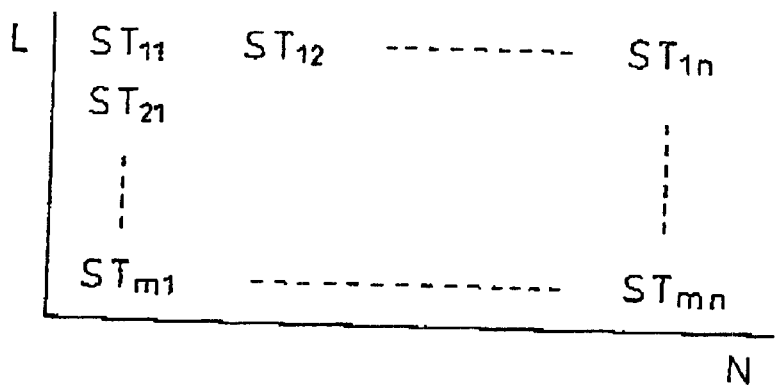
FIG. 17(A) is a view showing the target opening degree of throttle valve.
Figure 17B:
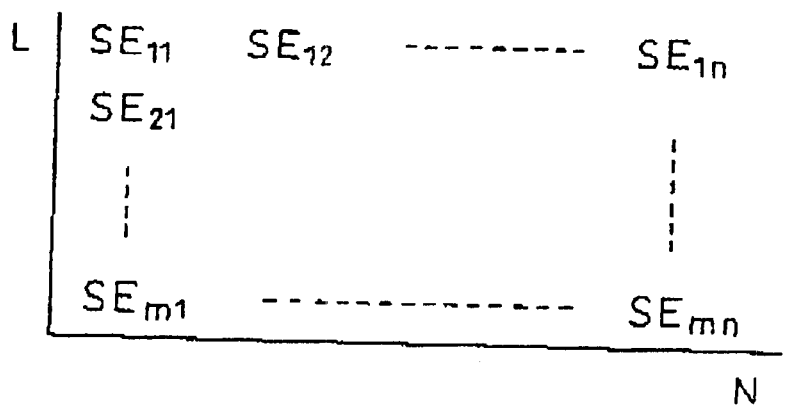
FIG. 17(B) is a view showing the target opening degree of the EGR control valve.

FIG. 16 shows target air-fuel ratios when the second combustion, i.e., the normal combustion as usual is carried out. In FIG. 16, the curves indicated by A/F=24, A/F=35, A/F=45, and A/F=60 shows respectively the cases in that the target air-fuel ratios are 24, 35, 45, and 60. A target opening degree (ST) of the throttle valve 16, required to make the air-fuel ratio the target air-fuel ratio, is memorized in the ROM of the electronic control unit as a map in which it is a function of the required engine load (L) and the engine speed (N) shown in FIG. 17(A). A target opening degree (SE) of the EGR control valve 23 required to make the air-fuel ratio the target air-fuel ratio is memorized in ROM of the electronic control unit as a map in which it is a function of the required engine load (L) and the engine speed (N) shown in FIG. 17(B).

Thus, in the diesel engine of the present embodiment, the first combustion, i.e., the low temperature combustion and the second combustion, i.e., the normal combustion are changed over on the basis of the amount of depression (L) of the accelerator pedal 40 and the engine speed (N). In each combustion, the opening degrees of the throttle valve 16 and the EGR control valve are controlled by the maps shown in FIGS. 15 and 17 on the basis of the amount of depression (L) of the accelerator pedal 40 and the engine speed (N).

Figure 18:
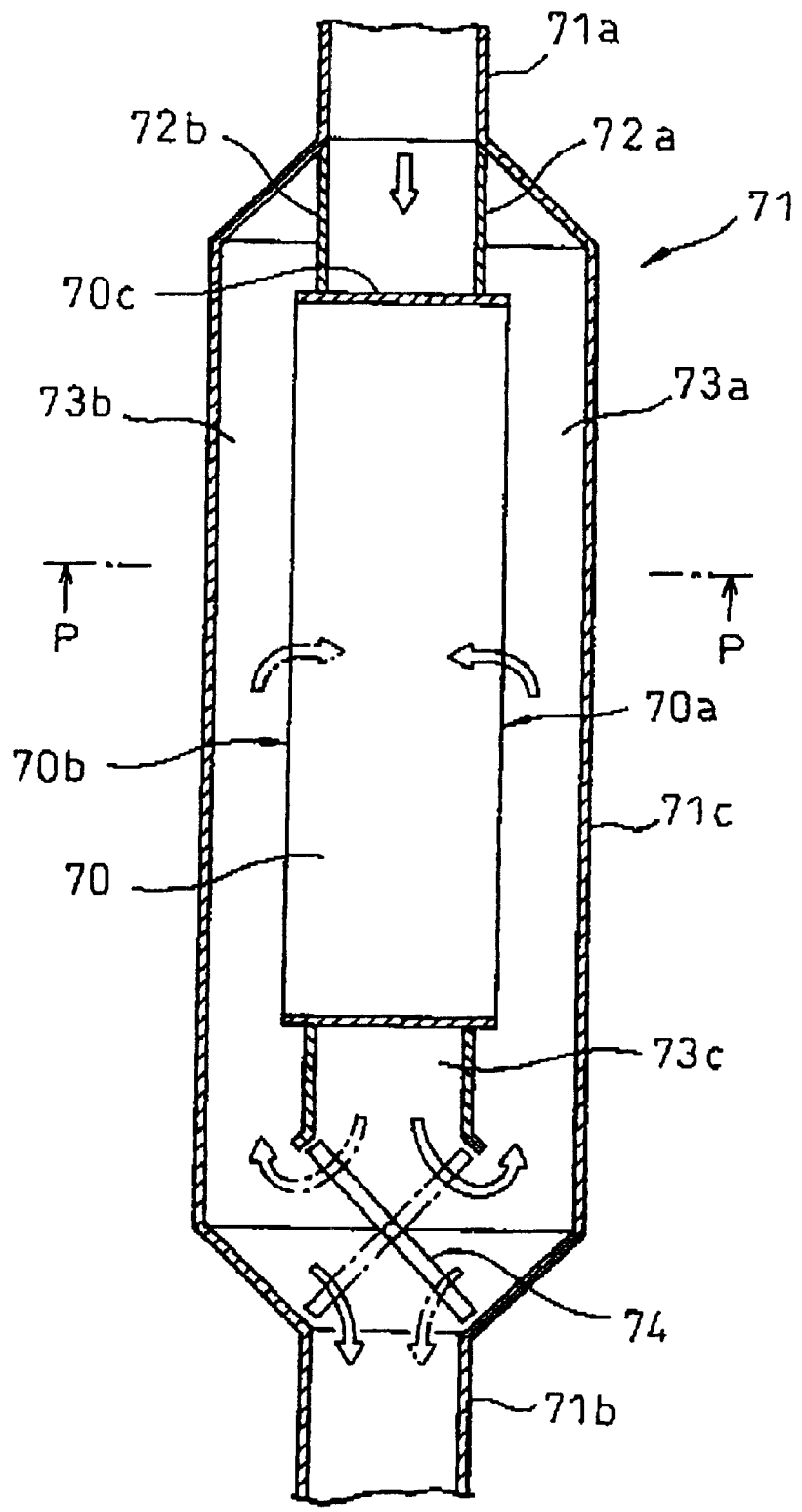
FIG. 18 is a plan sectional view showing the device for purifying the exhaust gas of an internal combustion engine according to the present invention.
Figure 19:
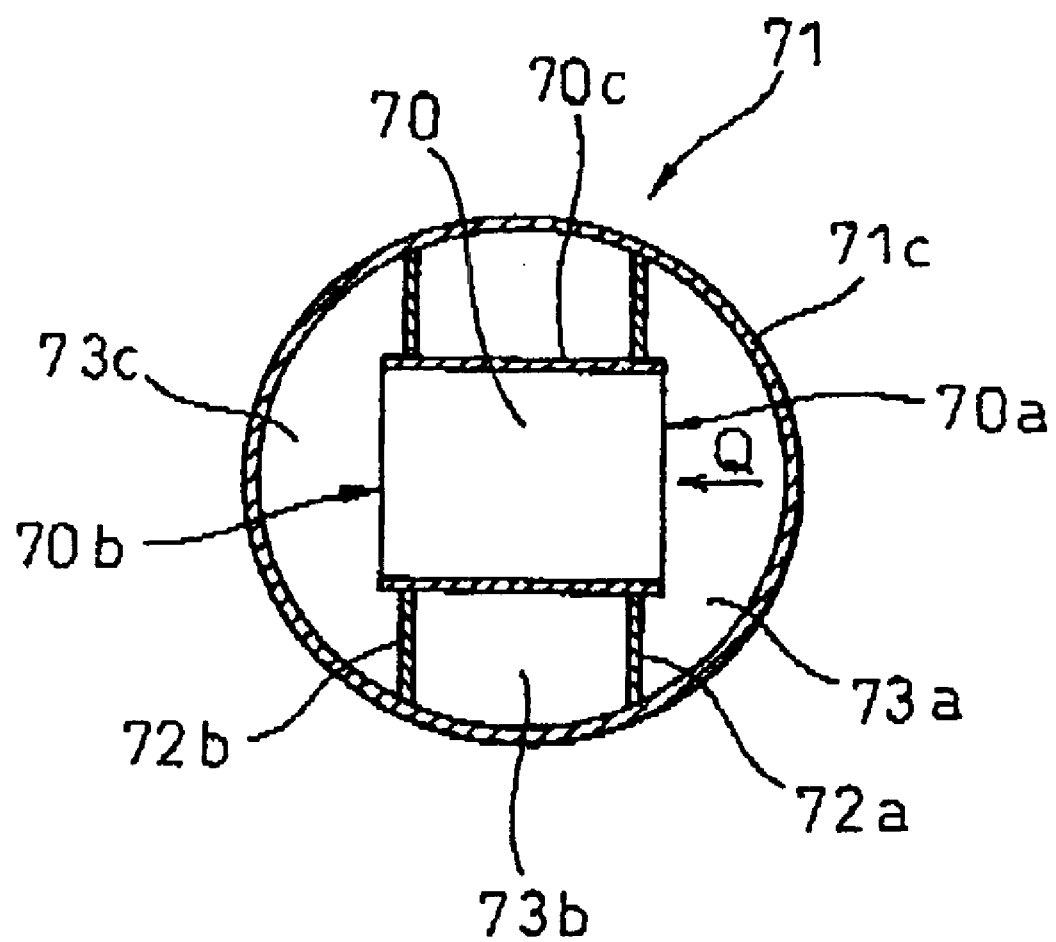
FIG. 19 is a P—P sectional view of FIG. 18.

FIG. 18 is a plan view illustrating a device for purifying the exhaust gas, and FIG. 19 is a P—P sectional view of FIG. 18. The device is connected to the immediate downstream side of the exhaust manifold 17 and is thus positioned in the exhaust system considerably upstream of the muffler that is positioned at the atmosphere opening end. The device has an exhaust pipe 71, The exhaust pipe 71 has a first small diameter portion 71a that is connected to the exhaust manifold 17, a second small diameter portion 71b that is connected to the downstream exhaust passage, and a large diameter portion 71c that positions between the first small diameter portion 71a and the second small diameter portion 71b. Both ends of the large diameter portion 71c have a frustum shape and are connected to the first diameter portion 71a and the second diameter portion 71b.

The inside space of the large diameter portion 71c is divided by two wall portions 72a, 72b that extend in the longitudinal direction and that are parallel each other, and thus forms a first flow passage 73a and a second flow passage 73b that position at both sides, and a third flow passage 73c that positions at the center. Here, all the exhaust gas from the first small diameter portion 71a flows in the third flow passage 73c. In the large diameter portion 71c, a particulate filter 70 that has a front shape of an oval is arranged such that the center lines of the particulate filter and the large diameter portion 71c intersect at right angles and such that the particulate filter 70 penetrates through both of the two wall portions 71a and 71b.

The particulate filter 70 has a first opening portion 70a and a second opening portion 70b through which the exhaust gas flows in and out from the particulate filter. The first opening portion 70a communicates with the first flow passage 73a and the second opening portion 70b communicates with the second flow passage 73b. Here, the above center line of the particulate filter means the center line that passes through the first opening portion 70a and the second opening portion 70b. As explained below in detail, each of the first opening portion 70a and the second opening portion 70b of the particulate filter 70 is constructed from a plurality of the openings. The third flow passage 73c is partly divided into the upper part and the lower part by the circumferential portion of the particulate filter 70 between the first opening portion 70a and the second opening portion 70b. Thus, the exhaust gas flows in contact with the circumferential portion 70c of the particulate filter 70 in the third flow passage.

Further, a pivotable valve body 74 is arranged at the downstream end of the large diameter portion 71c. In a first position of the valve body 74 shown by the solid-line, the third flow passage 73c is communicated with the first flow passage 73a and the second flow passage 73b is communicated with the second small diameter portion 71b. Therefore, the exhaust gas flows from the third flow passage 73c to the first flow passage 73a, and passes through the particulate filter 70 from the first opening portion 70a to the second opening portion 70b as shown by the solid-line arrow, and flows out to the second small diameter portion 71b via the second flow passage 73b. In a second position of the valve body 74 shown by the chain-line, the third flow passage 73c is communicated with the second flow passage 73b and the first flow passage 73a is communicated with the second small diameter portion 71b. Therefore, the exhaust gas flows from the third flow passage 73c to the second flow passage 73b, and passes through the particulate filter 70 from the second opening portion 70b to the first opening portion 70a as shown by the chain-line arrow, and flows out to the second small diameter portion 71b via the first flow passage 73a.

Thus, the valve body 74 is changed over from one of the first position and the second position to the other so that the upstream side and the downstream side of the particulate filter 70 can be reversed. Further, if the valve body 74 is assumed at an opening position between the first position and the second position, the exhaust gas flows from the third flow passage 73c to the second small diameter portion 71b without passing through the particulate filter 70 and thus the exhaust gas can bypass the particulate filter 70.

Thus, the present device for purifying the exhaust gas can reverse the exhaust gas upstream side and the exhaust gas downstream side of the particulate filter by a very simple structure. Further, the particulate filter requires a large opening area to facilitate the introduction of the exhaust gas. In the device, the opening portions of the particulate filter is arranged in the longitudinal direction of the exhaust pipe and thus the particulate filter having a large opening area can be used without making it difficult to mount it on the vehicle.

Figure 20A:
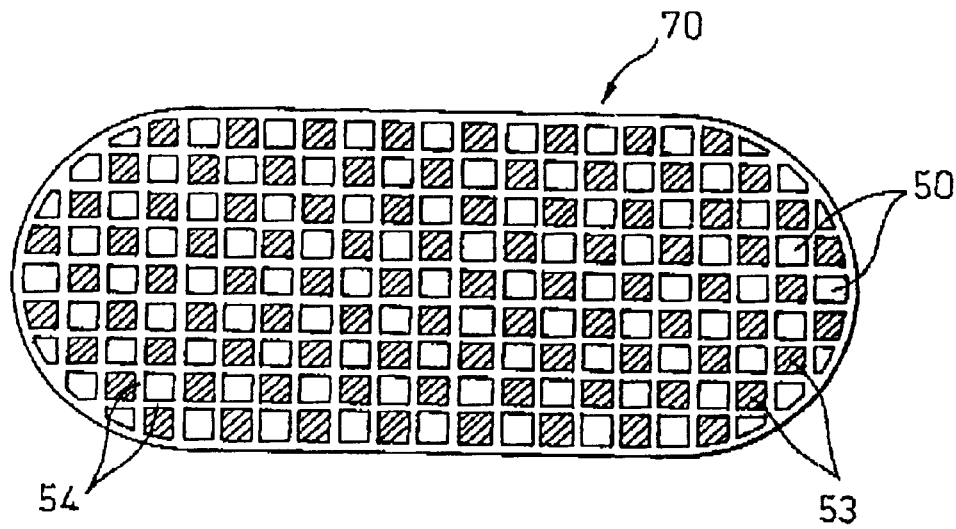
FIG. 20(A) is a front view showing the structure of the particulate filter.
Figure 20B:
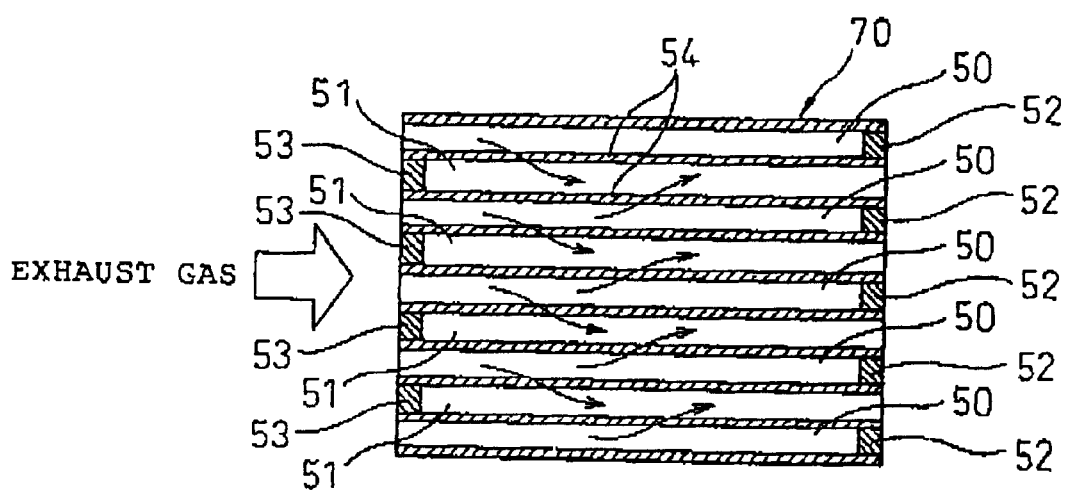
FIG. 20(B) is a side sectional view showing the structure of the particulate filter.

FIG. 20 shows the structure of the particulate filter 70, wherein (A) is a front view of the particulate filter 70, i.e., a view showing FIG. 19 from the direction of arrow, and (B) is a side sectional view thereof. As shown in these figures, the particulate filter 70 has an oval shape, and is, for example, the wall-flow type of a honeycomb structure formed of a porous material such as cordierite, and has many spaces in the axial direction divided by many partition walls 54 extending in the axial direction. One of any two neighboring spaces is closed by a plug 53 on the exhaust gas downstream side, and the other one is closed by a plug 53 on the exhaust gas upstream side. Thus, one of the two neighboring spaces serves as an exhaust gas flow-in passage 50 and the other one serves as an exhaust gas flow-out passage 51, causing the exhaust gas to necessarily pass through the partition wall 54 as indicated by arrows in FIG. 20(B). The particulates contained in the exhaust gas are much smaller than the pores of the partition wall 54, but collide with and are trapped on the exhaust gas upstream side surface of the partition wall 54 and the pores surface in the partition wall 54. Thus, each partition wall 54 works as a trapping wall for trapping the particulates. In the present particulate filter 70, in order to oxidize and remove the trapped particulates, an active-oxygen releasing agent and a noble metal catalyst, which will be explained below, are carried on both side surfaces of the partition wall 54 and preferably also on the pore surfaces in the partition wall 54.

The active-oxygen releasing agent releases active-oxygen to promote the oxidation of the particulates and, preferably, takes in and holds oxygen when excessive oxygen is present in the surroundings and releases the held oxygen as active-oxygen when the oxygen concentration in the surroundings drops.

As the noble metal catalyst, platinum Pt is usually used. As the active-oxygen releasing agent, there is used at least one selected from alkali metals such as potassium K, sodium Na, lithium Li, cesium Cs, and rubidium Rb, alkali earth metals such as barium Ba, calcium Ca, and strontium Sr, rare earth elements such as lanthanum La and yttrium Y, and transition metals.

As an active-oxygen releasing agent, it is desired to use an alkali metal or an alkali earth metal having an ionization tendency stronger than that of calcium Ca, i.e., to use potassium K, lithium Li, cesium Cs, rubidium Rb, barium Ba, or strontium Sr.

Next, explained below is how the trapped particulates on the particulate filter are oxidized and removed by the particulate filter carrying such an active-oxygen releasing agent with reference to the case of using platinum Pt and potassium K. The particulates are oxidized and removed in the same manner even by using another noble metal and another alkali metal, an alkali earth metal, a rear earth element, or a transition metal.

In a diesel engine, the combustion usually takes place in an excess air condition and, hence, the exhaust gas contains a large amount of excess air. That is, if the ratio of the air to the fuel supplied to the intake system and to the combustion chamber is referred to as an air-fuel ratio of the exhaust gas, the air-fuel ratio is lean. Further, NO generates in the combustion chamber and, hence, the exhaust gas contains NO. Further, the fuel contains sulfur S and sulfur S reacts with oxygen in the combustion chamber to form $SO_2$. Accordingly, the exhaust gas contains $SO_2$. Therefore, the exhaust gas containing excessive oxygen, NO, and $SO_2$ flows into the exhaust gas upstream side of the particulate filter 70.

Figure 21A:
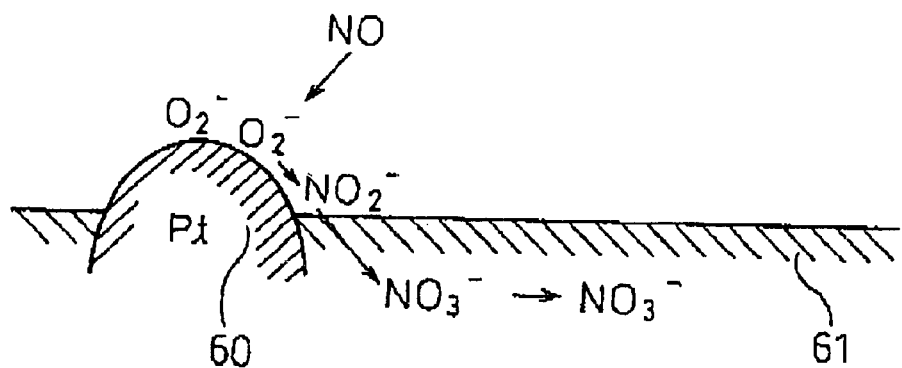
FIGS. 21(A) and 21(B) are views explaining the oxidizing action of the particulates.
Figure 21B:
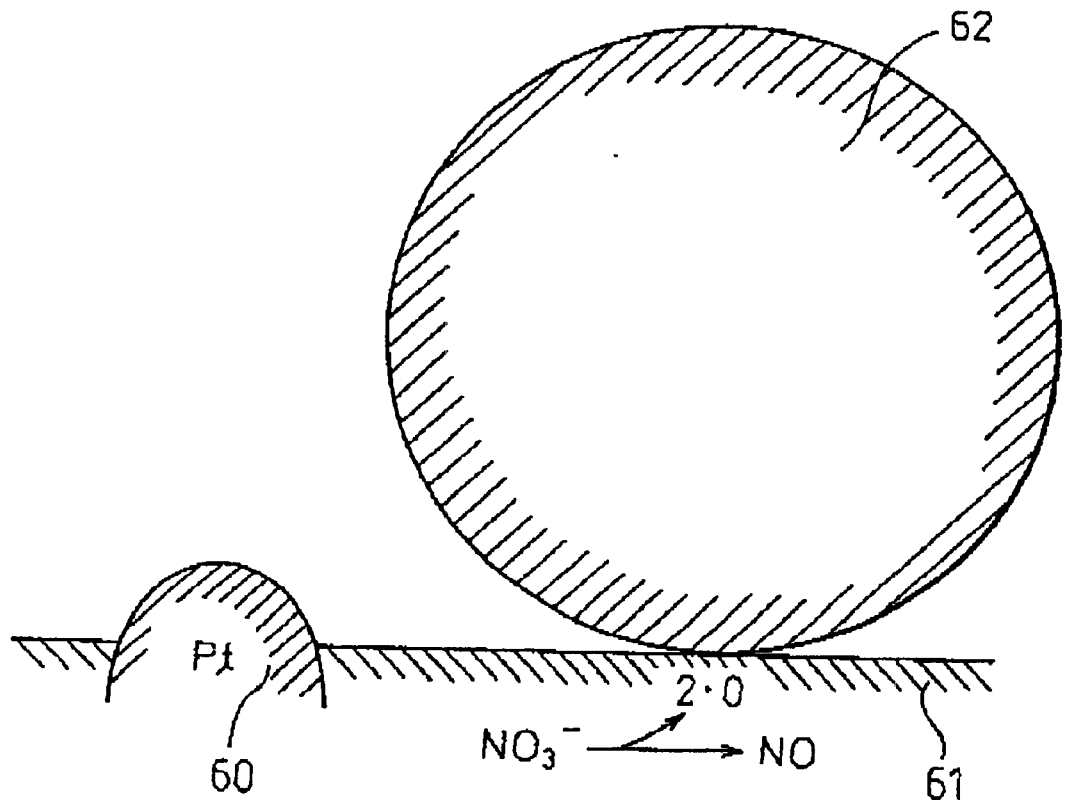

FIGS. 21(A) and 21(B) are enlarged views schematically illustrating the surface of the particulate filter 70 with which the exhaust gas comes in contact. In FIGS. 21(A) and 21(B), reference numeral 60 denotes a particle of platinum Pt and 61 denotes the active-oxygen releasing agent containing potassium K.

As described above, the exhaust gas contains a large amount of excess oxygen. When the exhaust gas contacts with the exhaust gas contact surface of the particulate filter, oxygen $O_2$ adheres onto the surface of platinum Pt in the form of $O_2^-$ or $O^{2-}$ as shown in FIG. 21(A). On the other hand, NO in the exhaust gas reacts with $O_2^-$ or $O^{2-}$ on the surface of platinum Pt to produce $NO_2$ ($2NO+O_2 \rightarrow 2NO_2$). Next, a part of the produced $NO_2$ is absorbed in the active-oxygen releasing agent 61 while being oxidized on platinum Pt, and diffuses in the active-oxygen releasing agent 61 in the form of nitric acid ion $NO_3^-$ while being combined with potassium K to form potassium nitrate $KNO_3$ as shown in FIG. 21(A). Thus, in the present embodiment, $NO_x$ contained in the exhaust gas is absorbed in the particulate filter 70 and an amount thereof released into the atmosphere can be decreased.

Further, the exhaust gas contains $SO_2$, as described above, and $SO_2$ also is absorbed in the active-oxygen releasing agent 61 due to a mechanism similar to that of the case of NO. That is, as described above, oxygen $O_2$ adheres on the surface of platinum Pt in the form of $O_2^-$ or $O^{2-}$, and $SO_2$ in the exhaust gas reacts with $O_2^-$ or $O^{2-}$ on the surface of platinum Pt to produce $SO_3$. Next, a part of the produced $SO_3$ is absorbed in the active-oxygen releasing agent 61 while being oxidized on the platinum Pt and diffuses in the active-oxygen releasing agent 61 in the form of sulfuric acid ion $SO_4^{2-}$ while being combined with potassium K to produce potassium sulfate $K_2SO_4$. Thus, potassium nitrate $KNO_3$ and potassium sulfate $K_2SO_4$ are produced in the active-oxygen releasing agent 61.

The particulates in the exhaust gas adhere on the surface of the active-oxygen releasing agent 61 carried by the particulate filter as designated at 62 in FIG. 21(B). At this time, the oxygen concentration drops on the surface of the active-oxygen releasing agent 61 with which the particulates 62 are in contact. As the oxygen concentration drops, there occurs a difference in the concentration from the active-oxygen releasing agent 61 having a high oxygen concentration and, thus, oxygen in the active-oxygen releasing agent 61 tends to migrate toward the surface of the active-oxygen releasing agent 61 with which the particulates 62 are in contact. As a result, potassium nitrate $KNO_3$ produced in the active-oxygen releasing agent 61 is decomposed into potassium K, oxygen O and NO, whereby oxygen O migrates toward the surface of the active-oxygen releasing agent 61 with which the particulates 62 are in contact, and NO is emitted to the outside from the active-oxygen releasing agent 61. NO emitted to the outside is oxidized on the platinum Pt on the downstream side and is absorbed again in the active-oxygen releasing agent 61.

At this time, further, potassium sulfate $K_2SO_4$ produced in the active-oxygen releasing agent 61 is also decomposed into potassium K, oxygen O, and $SO_2$, whereby oxygen O migrates toward the surface of the active-oxygen releasing agent 61 with which the particulates 62 are in contact, and $SO_2$ is emitted to the outside from the active-oxygen releasing agent 61. $SO_2$ released to the outside is oxidized on the platinum Pt on the downstream side and is absorbed again in the active-oxygen releasing agent 61. Here, however, potassium sulfate $K_2SO_4$ is stable and releases less active-oxygen than potassium nitrate $KNO_3$.

On the other hand, oxygen O migrating toward the surface of the active-oxygen releasing agent 61 with which the particulates 62 are in contact is the one decomposed from such compounds as potassium nitrate $KNO_3$ or potassium sulfate $K_2SO_4$. Oxygen O decomposed from the compound has a high level of energy and exhibits a very high activity. Therefore, oxygen migrating toward the surface of the active-oxygen releasing agent 61 with which the particulates 62 are in contact is active-oxygen O. Upon coming into contact with active-oxygen O, the particulates 62 are oxidized without producing luminous flame in a short time, for example, a few minutes or a few tens of minutes. Further, active-oxygen to oxidize the particulates 62 is also released when NO and $SO_2$ have been absorbed in the active-oxygen releasing agent 61. That is, it can be considered that $NO_x$ diffuses in the active-oxygen releasing agent 61 in the form of nitric acid ion $NO_3^-$ while being combined with oxygen atoms and to be separated from oxygen atoms, and during this time, active-oxygen is produced. The particulates 62 are also oxidized by this active-oxygen. Further, the particulates 62 adhered on the particulate filter 70 are not oxidized only by active-oxygen, but also by oxygen contained in the exhaust gas.

The higher the temperature of the particulate filter becomes, the more the platinum Pt and the active-oxygen releasing agent 61 are activated. Therefore, the higher the temperature of the particulate filter becomes, the larger the amount of active-oxygen O released from the active-oxygen releasing agent 61 per unit time becomes. Further, naturally, the higher the temperature of particulates is, the easier the particulates are oxidized. Therefore, the amount of particulates that can be oxidized and removed without producing luminous flame on the particulate filter per unit time increases with along an increase in the temperature of the particulate filter.

The solid line in FIG. 22 shows the amount of particulates (G) that can be oxidized and removed without producing luminous flame per unit time. In FIG. 22, the abscissa represents the temperature TF of the particulate filter. Here, FIG. 22 shows the case that the unit time is 1 second, that is, the amount of particulates (G) that can be oxidized and removed per 1 second. However, any time such as 1 minute, 10 minutes, or the like can be selected as unit time. For example, in the case that 10 minutes is used as unit time, the amount of particulates (G) that can be oxidized and removed per unit time represents the amount of particulates (G) that can be oxidized and removed per 10 minutes. In also this case, the amount of particulates (G) that can be oxidized and removed without producing luminous flame increases along with an increase in the temperature of particulate filter 70 as shown in FIG. 22.

The amount of particulates emitted from the combustion chamber per unit time is referred to as an amount of emitted particulates (M). When the amount of emitted particulates (M) is smaller than the amount of particulates (G) that can be oxidized and removed, for example, the amount of emitted particulates (M) per 1 second is smaller than the amount of particulates (G) that can be oxidized and removed per 1 second or the amount of emitted particulates (M) per 10 minutes is smaller than the amount of particulates (G) that can be oxidized and removed per 10 minutes, that is, in the area (I) of FIG. 22, the particulates emitted from the combustion chamber are all oxidized and removed without producing luminous flame successively on the particulate filter 70 for the short time.

Figure 23A:
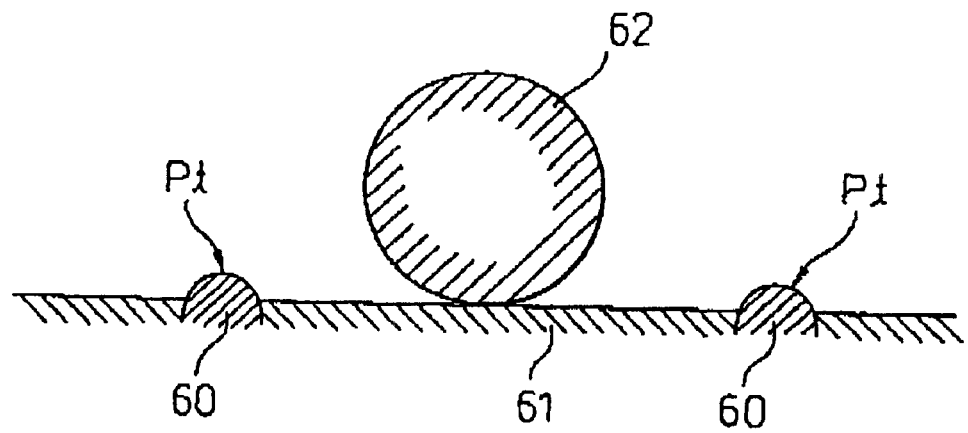
FIGS. 23(A), 23(B), and 23(C) are views explaining the depositing action of the particulates.
Figure 23B:
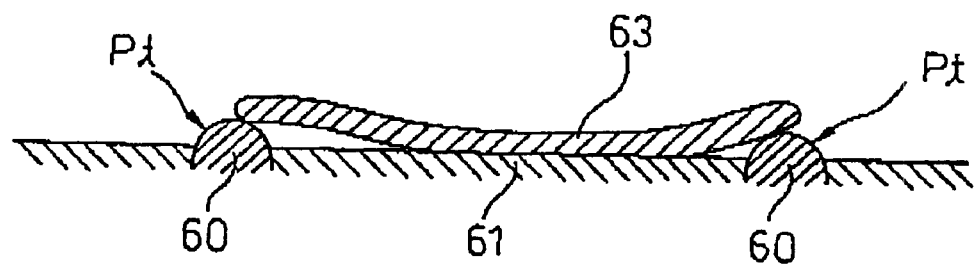
Figure 23C:
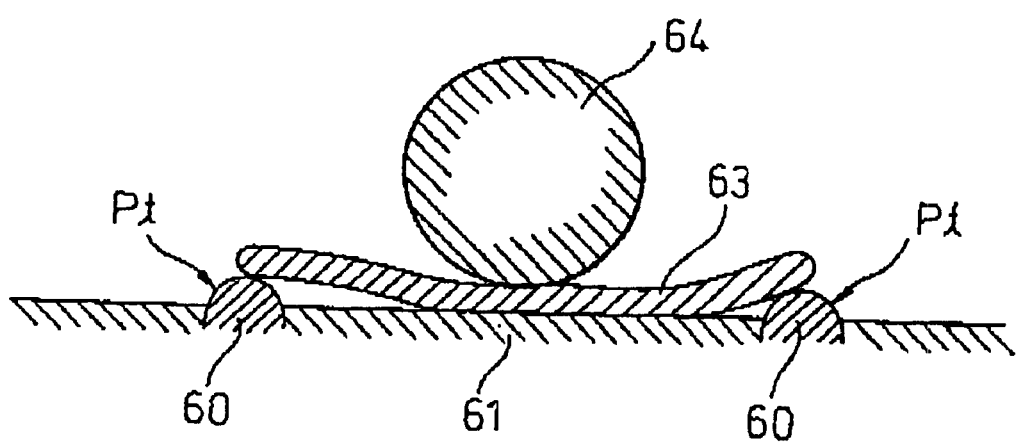

On the other hand, when the amount of emitted particulates (M) is larger than the amount of particulates that can be oxidized and removed (G), that is, in the area (II) of FIG. 22, the amount of active-oxygen is not sufficient for all particulates to be oxidized and removed successively. FIGS. 23(A) to (C) illustrate the manner of oxidation of the particulates in such a case.

That is, in the case that the amount of active-oxygen is lacking for oxidizing all particulates, when the particulates 62 adhere on the active-oxygen releasing agent 61, only a part of the particulates is oxidized as shown in FIG. 23(A), and the other part of the particulates that was not oxidized sufficiently remains on the exhaust gas upstream surface of the particulate filter. When the state where the amount of active-oxygen is lacking continues, a part of the particulates that was not oxidized remains on the exhaust gas upstream surface of the particulate filter successively. As a result, the exhaust gas upstream surface of the particulate filter is covered with the residual particulates 63 as shown in FIG. 23(B).

The residual particulates 63 are gradually transformed into carbonaceous matter that can hardly be oxidized. Further, when the exhaust gas upstream surface is covered with the residual particulates 63, the action of the platinum Pt for oxidizing NO and $SO_2$, and the action of the active-oxygen releasing agent 61 for releasing active-oxygen are suppressed. The residual particulates 63 can be gradually oxidized over a relative long period. However, as shown in FIG. 23(C), other particulates 64 deposit on the residual particulates 63 one after the other, and when the particulates are deposited so as to laminate, even if they are the easily oxidized particulates, these particulates may not be oxidized since these particulates are separated from the platinum Pt or from the active-oxygen releasing agent. Accordingly, other particulates deposit successively on these particulates 64. That is, when the state where the amount of emitted particulates (M) is larger than the amount of particulates that can be oxidized and removed (G) continues, the particulates deposit to laminate on the particulate filter.

Thus, in the area (I) of FIG. 22, the particulates are oxidized and removed without producing luminous flame for the short time and in the area (II) of FIG. 22, the particulates are deposited to laminate on the particulate filter. Therefore, the deposition of the particulates on the particulate filter can be prevented if the relationship between the amount of emitted particulates (M) and the amount of particulates that can be oxidized and removed (G) is in the area (I). AS a result, a pressure loss of the exhaust gas in the particulate filter hardly changes and it is maintained at a minimum pressure loss value that is nearly constant. Thus, the decrease of the engine output can be maintained as low as possible. However, this is not always realized, and the particulates may deposit on the particulate filter if nothing is done.

Figure 24:
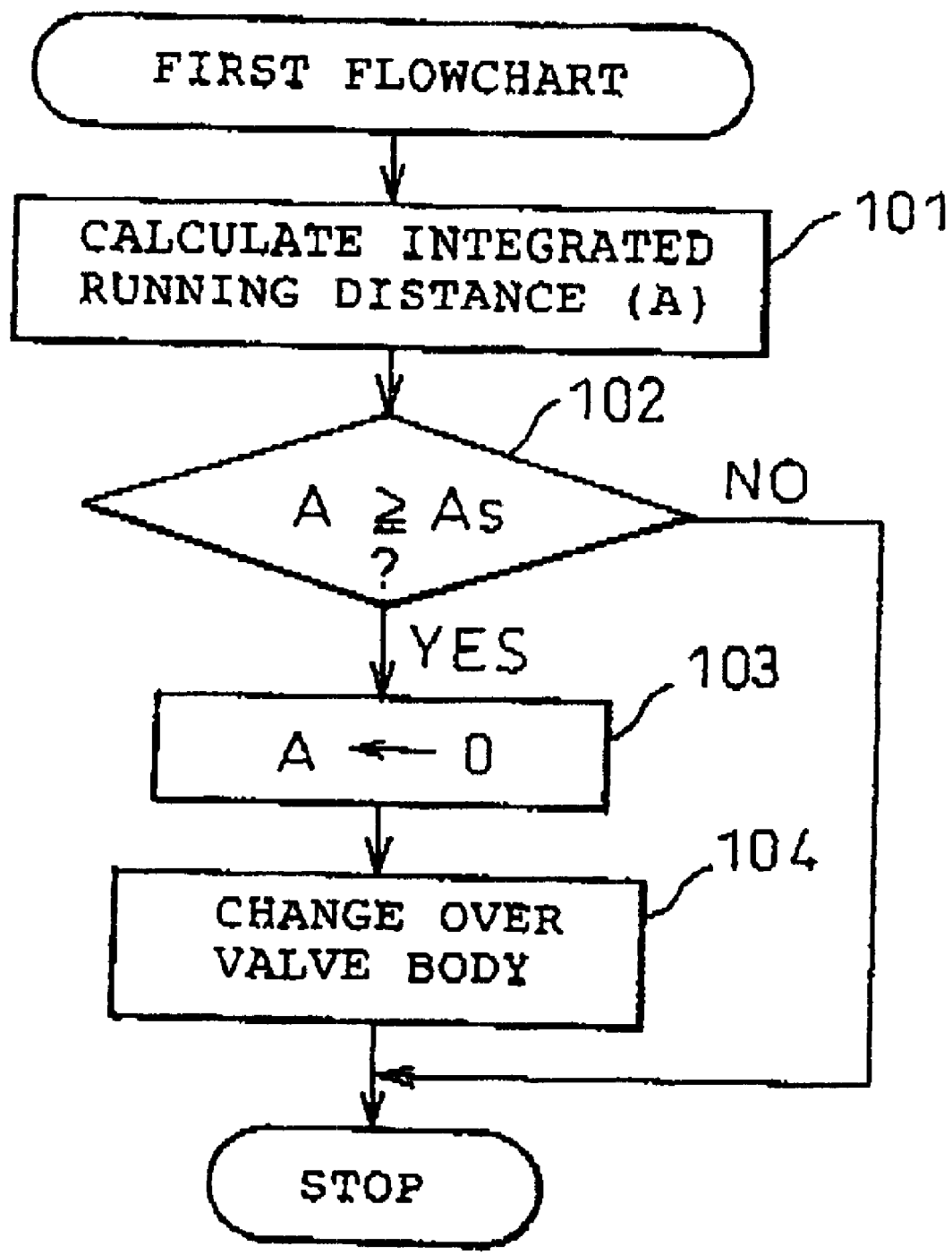
FIG. 24 is a first flowchart for preventing the deposition of the particulates on the particulate filter.

In the present embodiment, to prevent the deposition of particulates on the particulate filter, the above electronic control unit 30 controls to change over the valve body 74 according to a first flowchart shown in FIG. 24. The present flowchart is repeated every a predetermined time. At step 101, the integrated running distance (A) is calculated. Next, at step 102, it is determined if the integrated running distance (A) is larger than a predetermined running distance (As). When the result is negative, the routine is stopped. However, when the result is positive, the routine goes to step 103. At step 103, the integrated running distance (A) is reset to 0 and at step 104, the valve body 74 is changed over from one of the first position and the second position to the other, that is, the upstream side and the downstream side of the particulate filter are reversed.

FIG. 25 is an enlarged sectional view of the partition wall 54 of the particulate filter. While the vehicle travels over the predetermined running distance (As), the engine operation in the area (II) of the FIG. 22 can be carried out. Thus, the particulates collide with and are trapped by the exhaust gas upstream surface of the partition wall 54 and the exhaust gas opposing surface in the pores therein, i.e., one of the trapping surfaces of the partition wall 54, and are oxidized and removed by active-oxygen released from the active-oxygen releasing agent, but the particulates can remain for the insufficient oxidization as shown by grids in FIG. 25(A). At this stage, the exhaust resistance of the particulate filter does not have a bad influence on the traveling of the vehicle. However, if the particulates deposit more, problems, in which the engine output drops considerably, and the like, occur. By the first flowchart, at this stage, the upstream side and the downstream side of the particulate filter are reversed. Therefore, no particulates deposits again on the residual particulates on one of the trapping surfaces of the partition wall and thus the residual particulates can be gradually oxidized and removed by active-oxygen released from the one of the trapping surfaces. Further, in particular, the residual particulates in the pores in the partition wall are easily smashed into fine pieces by the exhaust gas flow in the reverse direction as shown in FIG. 25(B), and they mainly move through the pores toward the downstream side.

Accordingly, many of the particulates smashed into fine pieces diffuse in the pore in the partition wall, that is, the particulates flow in the pore. Therefore, they contact directly the active-oxygen releasing agent carried on the pores surface and thus have many chances in which they are oxidized and removed. Thus, if the active-oxygen releasing agent is also carried on the pores surface in the partition wall, the residual particulates can be very easily oxidized and removed. On the other trapping surface that is now on the upstream side, as the flow of the exhaust gas is reversed, i.e., the exhaust gas upstream surface of the partition wall 54 and the exhaust gas opposing surface in the pores therein to which the exhaust gas mainly impinges (of the oppose side of one of the trapping surfaces), the particulates in the exhaust gas adhere newly thereto and are oxidized and removed by active-oxygen released from the active-oxygen releasing agent. In this oxidization, a part of the active-oxygen released from the active-oxygen releasing agent on the other trapping surface moves to the downstream side with the exhaust gas, and it is made to oxidize and remove the particulates that still remain on one of the trapping surfaces despite of the reversed flow of the exhaust gas.

That is, the residual particulates on one of the trapping surfaces are exposed to not only active-oxygen released from this trapping surface but also the remainder of the active-oxygen used for oxidizing and removing the particulates on the other trapping surface by reversing the flow of the exhaust gas. Therefore, even if some particulates deposit laminate on one of the trapping surfaces of the partition wall of the particulate filter when the exhaust gas flow is reversed, active-oxygen arrives at the deposited particulates and no particulates deposit again on the deposited particulates due to the reversed flow of the exhaust gas and thus the deposited particulates are gradually oxidized and removed and they can be oxidized and removed sufficiently for some period till the next reversal of the exhaust gas.

In the first flowchart, the valve body is changed over every the predetermined running distance. However, the valve body may be changed over every a predetermined period. Of course, the valve body may not be periodically changed over in such a manner, but may be irregularly changed over. In either case, it is preferable to change over the valve body at least one time after the engine starts and before the engine is stopped, such that the valve body is changed over before the residual particulates transform into carbonaceous matter that can hardly be oxidized. If the particulates are oxidized and removed before the large amount of particulates is deposit, problems, in which the large amount of deposited particulates ignites and burns at once to melt the particulate filter by the burned heat thereof, and the like, can be prevented. Even if the large amount of particulates deposit on one trapping surface of the partition wall of the particulate filter for some reason when the valve body is changed over, the deposited particulates is easily smashed into fine pieces by the reversed flow of the exhaust gas. A part of the particulates that cannot be oxidized and removed in the pores in the partition wall is discharged from the particulate filter. However, therefore, it is prevented that the exhaust resistance of the particulate filter increases more to have a bad influence on the traveling of the vehicle.

Further, the other trapping surface of the partition wall of the particulate filter can newly trap the particulates.

Figure 26:
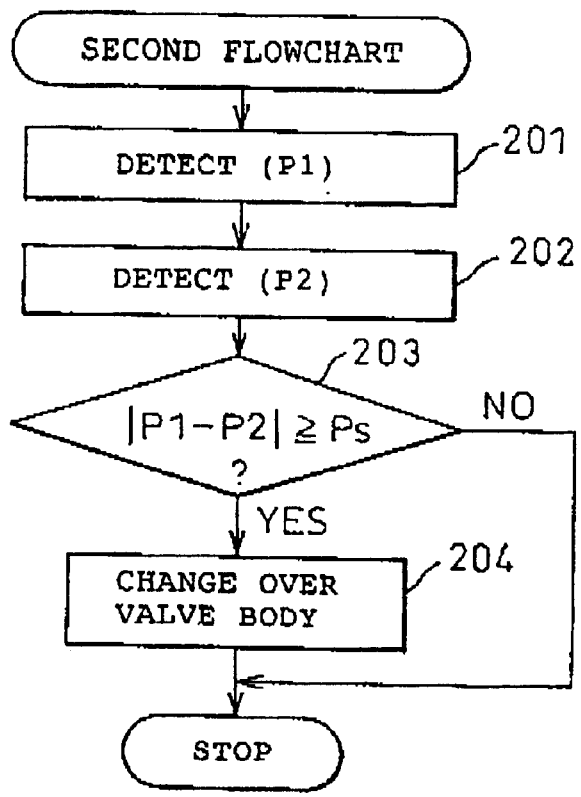
FIG. 26 is a second flowchart for preventing the deposition of the particulates on the particulate filter.

FIG. 26 shows a second flowchart for controlling to change over the valve body 74. The present flowchart is repeated every a predetermined time. At step 201, a pressure sensor detects an exhaust pressure (P1) at one side of the particulate filter 70, i.e., an exhaust pressure in the first flow passage 73a (refer to FIG. 18). Next, at step 202, a pressure sensor detects an exhaust pressure (P2) at the other side of the particulate filter 70, i.e., an exhaust pressure in the second flow passage 73b (refer to FIG. 18).

At step 203, it is determined if an absolute value of the difference between the exhaust pressures detected at steps 201 and 202 is larger than a predetermined pressure difference (Ps). Here, the absolute value of the difference pressure is used so that the rise in the difference pressure can be detected if either of the first flow passage 73a and the second flow passage 73b is the exhaust gas upstream side. When the result at step 203 is negative, the routine is stopped. However, when this result is positive, some particulates remain on the particulate filter so that at step 204, the valve body 74 is changed over and thus the upstream side and downstream side of the particulate filter are reversed.

Accordingly, as the above mention, the residual particulates are oxidized and removed from the particulate filter. Thus, utilizing the difference pressure between the both sides of the particulate filter, it is indirectly determined that some particulates remain on the particulate filter and thus it can be certainly prevented that the engine output drops much by the additional deposited particulates. Of course, other than the difference pressure, for example, observing the change of electric resistance on a predetermined partition wall of the particulate filter, it may be determined that some particulates deposit on the particulate filter when the electric resistance becomes equal to or smaller than a predetermined value by the deposition of the particulates. Besides, utilizing the fact that a transmissivity or reflectivity of light on a predetermined partition wall of the particulate filter drops along with the deposition of the particulates thereon, it can be determined that some particulates have deposited on the particulate filter. If it is directly determined that the particulates remain in such a manner and the valve body is changed over, it can be more certainly prevented that the engine output drops. Strictly speaking, the difference in pressure between the both sides of the particulate filter changes in accordance with the pressure of the exhaust gas discharged from the combustion chamber every engine operating condition. Accordingly, in the determination of the deposition of the particulates, it is preferable to specify the engine operating condition.

Thus, the reverse of the upstream side and the downstream side of the particulate filter is very effective to oxidize and remove the residual and deposited particulates. Therefore, even if the valve body is sometimes changed over without the determination of the time, it can be favorably prevented that the engine output drops much due to the large amount of deposited particulates.

Figure 27:
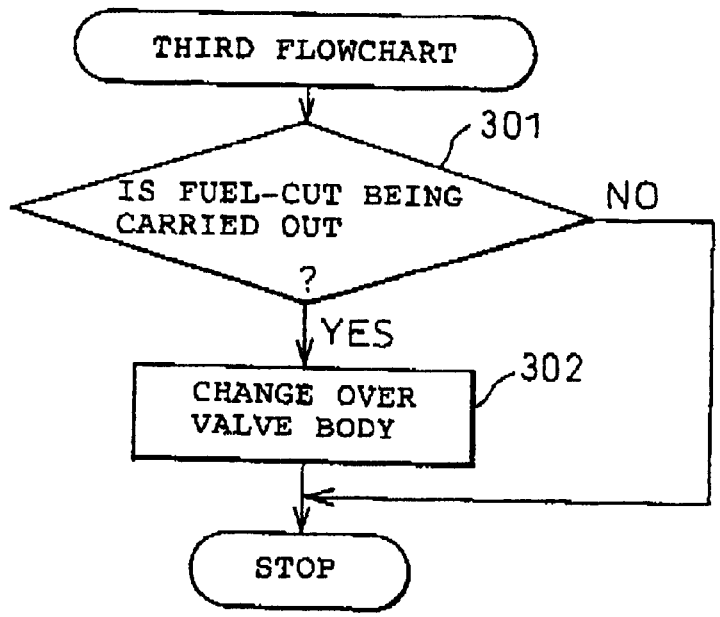
FIG. 27 is a third flowchart for preventing the deposition of the particulates on the particulate filter.

By the way, in the structure of the valve body 74 of the present embodiment, as mentioned above, a part of the exhaust gas bypasses the particulate filter 70 during the changeover from one of the first position and the second position to the other. Accordingly, at this time, if the exhaust gas includes particulates, the particulates are emitted into the atmosphere. To present this, as in a third flowchart shown in FIG. 27, the valve body 74 may be changed over when a fuel-cut is carried out. When a fuel-cut is carried out, no combustion is carried out in the cylinder and thus the exhaust gas includes no particulates. In the determination of the execution of fuel-cut, a fuel-cut signal given to the fuel injector may be utilized, the depression of brake pedal may be detected while the vehicle is traveling, or the release of accelerator pedal may be detected while the vehicle is traveling.

According to the device of the present embodiment, the valve body 74 is changed over and the exhaust gas upstream side and the exhaust gas downstream side of the particulate filter are reversed so that the deposition of the particulates on the particulate filter 70 can be favorably prevented. Further, according to the structure of the present device, the circumferential portion 70c of the particulate filter 70 is always in contact with the exhaust gas in the third flow passage 73c, and thus it is heated by the exhaust gas and the temperature of the particulate filter can be made high. Therefore, as shown in the graph of FIG. 22, the amount of particulates that can be oxidized and removed is maintained relative large and thus the deposition of the particulates on the particulate filter can be prevented more certainly. Further, if the temperature of the particulate filter is made high, reducing materials such as HC and CO that are slightly included in the exhaust gas when the air-fuel ratio in the combustion is lean can be favorably burned by using the oxidation catalyst carried on the particulate filter. Therefore, the temperature of the particulate filter can be raised higher.

The particulate filter 70 of the present embodiment has the large opening portions 70a and 70b and the length between the opening portions is relatively short. Therefore, a large amount of the exhaust gas can pass through the particulate filter. Such a particulate filter 70 is arranged in the exhaust pipe 71 such that the opening portions are directed in the longitudinal direction of the exhaust pipe. Therefore, the device can be made compact. Accordingly, the device can be arranged at the immediate downstream side of the exhaust manifold adjacently to the engine body and thus heat of the exhaust can be utilized very effectively to heat the particulate filter.

Further, in the deceleration and the like, when the temperature of the exhaust gas is made low, the exhaust gas is made to bypass the particulate filter by the opening position of the valve body 74, and thus the exhaust gas can be prevented for passing through the particulate filter. However, this low temperature exhaust gas flows in contact with the circumferential portion of the particulate filter and thus the temperature of the particulate filter drops in the deceleration. After the deceleration, the high temperature exhaust gas raises the temperature of the particulate filter soon. Thus, in the deceleration, the amount of particulates that can be oxidized and removed of the particulate filter drops. However, at this time, the exhaust gas includes few particulates, and thus no problem particularly occurs.

Besides, the whole particulate filter of the present embodiment is surrounded by the flow of the exhaust gas, i.e., by a gas layer. Thus, in comparison with a usual device for purifying the exhaust gas that is adjacent to the atmosphere via a case, the device of the embodiment can sufficiently suppress the heat release of the particulate filter caused by wind during running. Therefore, the temperature of the particulate filter can be easily maintained high.

Figure 28:
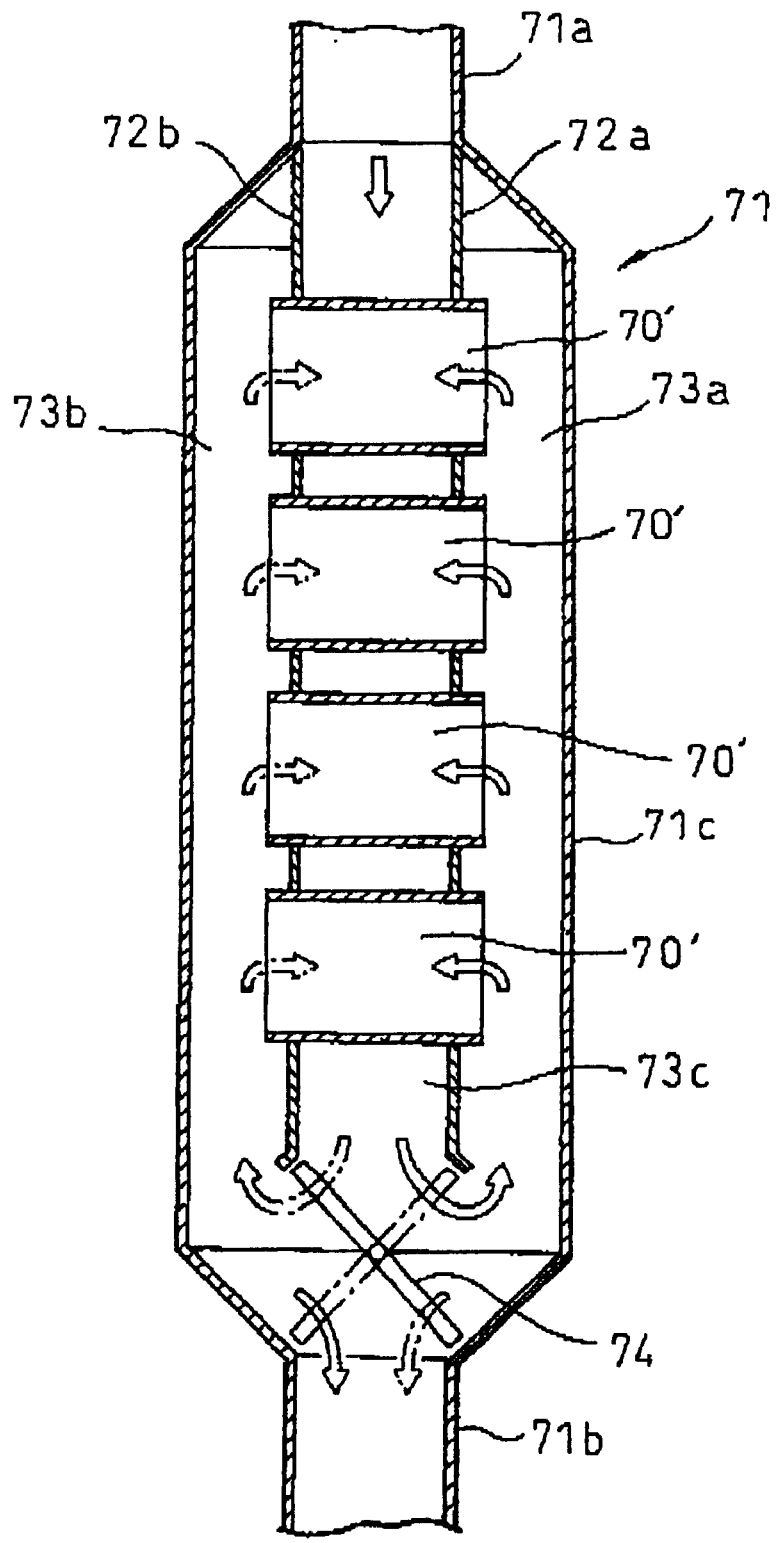
FIG. 28 is a plan sectional view showing a modification of the device for purifying the exhaust gas of an internal combustion engine of FIG. 18.

In the present embodiment, the particulate filter 70 is single and has the oval sectional shape. However, this does not limit the present invention. For example, as shown in FIG. 28, a plurality of particulate filters 70' that have circular sectional shape or the like may be arranged adjacently with one another in the longitudinal direction of the exhaust pipe by the necessary number of the particulate filters. In the single particulate filter, in particular, the whole width of the partition wall in the center of the height direction is made long and thus the rigidity of the particulate filter is slightly low. On the other hand, by using a plurality of the particulate filters, each particulate filter 70' is made compact and thus has a high rigidity. Thus, the durability of each particulate filter can be improved. Besides, the valve body 74 is arranged downstream of the exhaust pipe 71. This is an advantage for the valve body, as a pivotable portion, to be away from the high temperature engine body. However, of course, the second small diameter portion 71b is positioned at the exhaust upstream side and the valve body 74 may be upstream of the exhaust pipe 71. Besides, in the present embodiment, the center line passing through the first opening portion and the second opening portion of the particulate filter 70 intersects with the center line of the large diameter portion 71c of the exhaust pipe 71 at right angles. However, this does not limit the present invention. For example, the particulate filter 70 may not be positioned at the center of the large diameter portion 71c and the opening portions of the particulate filter 70 may be inclined with the center line of the large diameter portion. Namely, if the center line of the particulate filter may intersect with the center line of the large diameter portion in plan view, the device having the above mentioned effects can be constructed.

Further, when the air-fuel ratio of the exhaust gas is made rich, i.e., when the oxygen concentration in the exhaust gas is decreased, active-oxygen O is released at one time from the active-oxygen releasing agent 61 to the outside. Therefore, the deposited particulates become particulates that are easily oxidized by the active-oxygen O released at one time and thus they can be easily oxidized and removed.

On the other hand, when the air-fuel ratio is maintained lean, the surface of platinum Pt is covered with oxygen, that is, oxygen contamination is caused. When such oxygen contamination is caused, the oxidization action to $NO_x$ of platinum Pt drops and thus the absorbing efficiency of $NO_x$ drops. Therefore, the amount of active-oxygen released from the active-oxygen releasing agent 61 decreases. However, when the air-fuel ratio is made rich, oxygen on the surface of platinum Pt is consumed and thus the oxygen contamination is cancelled. Accordingly, when the air-fuel ratio is changed over from rich to lean again, the oxidization action to $NO_x$ becomes strong and thus the absorbing efficiency rises. Therefore, the amount of active-oxygen released from the active-oxygen releasing agent 61 increases.

Thus, when the air-fuel ratio is maintained lean, if the air-fuel ratio is changed over from lean to rich once in a while, the oxygen contamination of platinum Pt is cancelled every this time and thus the amount of released active-oxygen when the air-fuel ratio is lean increases. Therefore, the oxidization action of the particulates on the particulate filter 70 can be promoted.

Further, the result of the cancellation of the oxygen contamination is that the reducing agent burns and thus the burned heat thereof raises the temperature of the particulate filter. Therefore, the amount of particulates that can be oxidized and removed of the particulate filter increases and thus the residual and deposited particulates are oxidized and removed more easily. If the air-fuel ratio in the exhaust gas is made rich immediately after the upstream side and the downstream side of the particulate filter is reversed by the valve body 74, the other trapping surface on which the particulates do not remain releases active-oxygen more easily than the one trapping surface. Thus, the larger amount of released active-oxygen can oxidize and removed the residual particulates on the one trapping surface more certainly. Of course, the air-fuel ratio of the exhaust gas may be sometimes made rich regardless the changeover of the valve body 74. Therefore, the particulates hardly remain or deposit on the particulate filter.

AS a method to make the air-fuel ratio rich, for example, the above-mentioned low temperature combustion may be carried out. Of course, when changing over from the normal combustion to the low temperature combustion, or before this, the exhaust gas upstream side and the exhaust gas downstream side of the particulate filter may be reversed. Further, to make the air-fuel ratio of the exhaust gas rich, the combustion air-fuel ratio may be merely made rich. Further, in addition to the main fuel injection in the compression stroke, the fuel injector may inject fuel into the cylinder in the exhaust stroke or the expansion stroke (post-injection) or may injected fuel into the cylinder in the intake stroke (pre-injection). Of course, an interval between the post-injection or the pre-injection and the main fuel injection may not be provided. Further, fuel may be supplied to the exhaust system. As above mentioned, the low temperature combustion is carried out in the low engine load side and thus the low temperature combustion is often carried out immediately after engine deceleration when a fuel-cut is carried out. Therefore, in the third flowchart, immediately after the valve body 74 is changed over, the low temperature combustion is carried out and thus the air-fuel ratio of the exhaust gas is frequently made rich.

By the way, when $SO_3$ exists, calcium Ca in the exhaust gas forms calcium sulfate $CaSO_4$. Calcium sulfate $CaSO_4$ is hardly oxidized and removed and thus it remains on the particulate filter as ash. To prevent blocking of the meshes of the particulate filter caused by the remained calcium sulfate $CaSO_4$, it is preferable that an alkali metal or an alkali earth metal having an ionization tendency stronger than that of calcium Ca, such as potassium K is used as the active-oxygen releasing agent 61. Therefore, $SO_3$ diffused in the active-oxygen releasing agent 61 is combined with potassium K to form potassium sulfate $K_2SO_4$ and thus calcium Ca is not combined with $SO_3$ but passes through the partition walls of the particulate filter. Accordingly, the meshes of the particulate filter are not blocked by the ash. Thus, it is desired to use, as the active-oxygen releasing agent 61, an alkali metal or an alkali earth metal having an ionization tendency stronger than calcium Ca, such as potassium K, lithium Li, cesium Cs, rubidium Rb, barium Ba or strontium Sr.

Even when only a noble metal such as platinum Pt is carried on the particulate filter as the active-oxygen releasing agent, active-oxygen can be released from $NO_2$ or $SO_3$ held on the surface of platinum Pt. However, in this case, a curve that represents the amount of particulates that can be oxidized and removed (G) is slightly shifted toward the right compared with the solid curve shown in FIG. 22. Further, ceria can be used as the active-oxygen releasing agent. Ceria absorbs oxygen when the oxygen concentration is high ($Ce_2O_3 \rightarrow 2CeO_2$) and releases active-oxygen when the oxygen concentration decreases ($2CeO_2 \rightarrow Ce_2O_3$). Therefore, in order to oxidize and remove the particulates, the air-fuel ratio of the exhaust gas must be made rich at regular intervals or at irregular intervals. Instead of the ceria, iron Fe or tin Sn can be used as the active-oxygen releasing agent.

As the active-oxygen releasing agent, further, it is also allowable to use an $NO_x$ absorbent for purifying $NO_x$. In this case, the air-fuel ratio of the exhaust gas must be made rich at least temporarily to release and reduce the absorbed $NO_x$ and $SO_x$. It is preferable to make the air-fuel ratio rich after the exhaust gas upstream side and the exhaust gas downstream side of the particulate filter are reversed. The diesel engine of the embodiments can change over the low temperature combustion and the normal combustion. This does not limit the present invention. Of course, the present invention can be also applied to a diesel engine that carries out only normal combustion or a gasoline engine that emits particulates.

In the present embodiment, the particulate filter itself carries the active-oxygen releasing agent and active-oxygen released from the active-oxygen releasing agent oxidizes and removes the particulates. However, this does not limit the present invention. For example, a particulates oxidization material such as active-oxygen and $NO_2$ that functions the same as active-oxygen may be released from a particulate filter or a material carried thereon, or may flow into a particulate filter from the outside thereof. In case that the particulates oxidization material flows into the particulate filter from the outside thereof, if the first trapping surface and the second trapping surface of the partition wall are alternately used to trap the particulates, on one trapping surface that is now on the exhaust gas downstream side, no particulates deposit newly on the residual particulates and the residual particulates can be gradually oxidized and removed by the particulates oxidization material flowing from the other trapping surface and thus the residual particulates are perfectly removed after some period. During this period, the other trapping surface can trap the particulates and the trapped particulates are oxidized and removed by the particulates oxidization material on the other trapping surface. Thus, effects the same as the above-mentioned can be obtained. Of course, in this case, if the temperature of the particulate filter rises, the temperature of the particulates themselves rises and thus the oxidizing and removing thereof can be made easy. Therefore, it is advantage that the device is constructed as the present embodiment.

According to the device for purifying the exhaust gas of the present invention, the device comprises the particulate filter on which the trapped particulates are oxidized and removed and the reversing means for reversing the exhaust gas upstream side and the exhaust gas downstream side of the particulate filter. The particulate filter has a trapping wall for trapping the particulates, the trapping wall has a first trapping surface and a second trapping surface, and the reversing means reverses the exhaust gas upstream side and the downstream side of the particulate filter so that the first trapping surface and the second trapping surface are used alternately to trap the particulates. The particulate filter has the first opening portion and the second opening portion through which the exhaust gas flows in and out from the particulate filter, and is arranged in the exhaust pipe upstream of the muffler. At least part of the circumferential portion of the particulate filter between the first opening portion and the second opening portion is in contact with the flow of the exhaust gas in the exhaust pipe. Some particulates can remain on the first trapping surface of the trapping wall of the particulate filter due to the insufficient oxidization on the particulate filter according to the engine operating condition. However, the exhaust gas upstream side and the exhaust gas downstream side of the particulate filter are reversed by the reversing means so that no particulates deposit again on the residual particulates on the first trapping surface and thus the residual particulates can be oxidized and removed gradually. At the same time, the second trapping surface of the trapping wall starts to trap the particulates. Thus, if the first trapping surface and the second trapping surface is used alternately to trap the particulates, an amount of particulates trapped on each trapping surface can be decreased to less than that in case where one trapping surface always traps the particulates. This is an advantage to oxidize and remove the particulates. Further, the circumferential portion of the particulate filter is heated by the exhaust gas that is in contact therewith and thus the temperature of the particulate filter is maintained high so that the particulates can come to be oxidized easily. Therefore, the blocking of the meshes of the particulate filter can be certainly prevented.

What is claimed is:

1. A device for purifying the exhaust gas of an internal combustion engine comprising a particulate filter on which the trapped particulates are oxidized and reversing means for reversing the exhaust gas upstream side and the exhaust gas downstream side of said particulate filter, wherein said particulate filter has a trapping wall for trapping the particulates, said trapping wall has a first trapping surface and a second trapping surface, said reversing means reverses the exhaust gas upstream side and the exhaust gas downstream side of said particulate filter so that said first trapping surface and said second trapping surface are used alternately to trap the particulates, said particulate filter has a first opening portion and a second opening portion through which the exhaust gas flows in and out from said particulate filter and is arranged in the exhaust pipe upstream of the muffler, and at least part of the circumferential portion of said particulate filter between said first opening portion and said second opening portion is contact with the flow of the exhaust gas in said exhaust pipe.

2. A device for purifying the exhaust gas of an internal combustion engine according to claim 1, wherein said trapping wall carries an active-oxygen releasing agent, and active-oxygen released from said active-oxygen releasing agent oxidizes the particulates.

3. A device for purifying the exhaust gas of an internal combustion engine according to claim 2, wherein said active-oxygen releasing agent takes in and holds oxygen when excessive oxygen is present in the surroundings and releases the held oxygen as active-oxygen when the oxygen concentration in the surroundings drops.

4. A device for purifying the exhaust gas of an internal combustion engine according to claim 2, wherein said active-oxygen releasing agent holds $NO_x$ to combine the $NO_x$ with oxygen when excessive oxygen is present in the surroundings and releases to decompose the combined $NO_x$ and oxygen into $NO_x$ and active-oxygen when the oxygen concentration in the surroundings drops.

5. A device for purifying the exhaust gas of an internal combustion engine according to claim 1, wherein the center line passing through said first opening portion and said second opening portion of said particulate filter intersects with the center line of said exhaust pipe in plan view.

6. A device for purifying the exhaust gas of an internal combustion engine according to claim 5, wherein a plurality of said particulate filters are arranged in the longitudinal direction of said exhaust pipe.

7. A device for purifying the exhaust gas of an internal combustion engine according to claim 5, wherein said exhaust pipe has a first flow passage, a second flow passage, and a third flow passage that are divided in the longitudinal direction, said first flow passage is communicated with said first opening portion of said particulate filter, said second flow passage is communicated with said second opening portion of said particulate filter, and at least part of said circumferential portion of said particulate filter is in contact with the flow of the exhaust gas in said third flow passage.

8. A device for purifying the exhaust gas of an internal combustion engine according to claim 7, wherein said reversing means has a valve body, makes said valve body to be a first position so that said third flow passage is communicated with said first flow passage and so that said second flow passage is communicated with one of the exhaust gas upstream side and the exhaust gas downstream side of said exhaust pipe, makes said valve body to be a second position so that said third flow passage is communicated with said second flow passage and so that said first flow passage is communicated with said one of the exhaust gas upstream side and the exhaust gas downstream side of said exhaust pipe, and changes over said valve body from one of said first position and said second position to the other so that the exhaust gas upstream side and the exhaust gas downstream side of said particulate filter are reversed.

9. A device for purifying the exhaust gas of an internal combustion engine according to claim 2, wherein the center line passing through said first opening portion and said second opening portion of said particulate filter intersects with the center line of said exhaust pipe in plan view.

10. A device for purifying the exhaust gas of an internal combustion engine according to claim 3, wherein the center line passing through said first opening portion and said second opening portion of said particulate filter intersects with the center line of said exhaust pipe in plan view.

11. A device for purifying the exhaust gas of an internal combustion engine according to claim 4, wherein the center line passing through said first opening portion and said second opening portion of said particulate filter intersects with the center line of said exhaust pipe in plan view.

12. A device for purifying the exhaust gas of an internal combustion engine according to claim 6, wherein said exhaust pipe has a first flow passage, a second flow passage, and a third flow passage that are divided in the longitudinal direction, said first flow passage is communicated with said first opening portion of said particulate filter, said second flow passage is communicated with said second opening portion of said particulate filter, and at least part of said circumferential portion of said particulate filter is in contact with the flow of the exhaust gas in said third flow passage.

* * * * *